(12) United States Patent
Taira et al.

(10) Patent No.: US 9,037,331 B2
(45) Date of Patent: May 19, 2015

(54) TWO-WHEELED INVERTED PENDULUM VEHICLE AND CONTROL METHOD THEREFOR

(71) Applicants: Tetsuya Taira, Nisshin (JP); Hiroshi Bitoh, Toyota (JP)

(72) Inventors: Tetsuya Taira, Nisshin (JP); Hiroshi Bitoh, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 5 days.

(21) Appl. No.: 13/974,409

(22) Filed: Aug. 23, 2013

(65) Prior Publication Data

US 2014/0067178 A1 Mar. 6, 2014

(30) Foreign Application Priority Data

Aug. 29, 2012 (JP) ................. 2012-188417

(51) Int. Cl.
| | | |
|---|---|---|
| *B62K 3/00* | (2006.01) | |
| *B60W 30/00* | (2006.01) | |
| *B60W 30/18* | (2012.01) | |
| *B60T 8/88* | (2006.01) | |
| *B60T 8/17* | (2006.01) | |
| *B60L 3/04* | (2006.01) | |

(Continued)

(52) U.S. Cl.
CPC ............. *B62K 3/007* (2013.01); *G06F 17/10* (2013.01); *B60L 11/18* (2013.01); *Y02T 10/648* (2013.01); *B60L 3/0061* (2013.01); *B60L 3/0076* (2013.01); *B60L 3/0084* (2013.01); *B60L 15/2009* (2013.01); *B60L 2200/24* (2013.01); *B60L 3/102* (2013.01); *B60L 3/04* (2013.01); *B60T 8/17* (2013.01); *B60T 8/1755* (2013.01); *B60T 8/88* (2013.01); *B60W 30/18109* (2013.01); *B60W 30/188* (2013.01); *B60W 2300/34* (2013.01); *B60W 30/00* (2013.01)

(58) Field of Classification Search
None
See application file for complete search history.

(56) References Cited

U.S. PATENT DOCUMENTS

| | | | |
|---|---|---|---|
| 6,223,104 B1 | 4/2001 | Kamen et al. | |
| 6,538,411 B1 * | 3/2003 | Field et al. | 318/638 |

(Continued)

FOREIGN PATENT DOCUMENTS

| | | | |
|---|---|---|---|
| JP | 2009-187561 A | | 8/2009 |
| JP | 2013135501 A | * | 7/2013 |

(Continued)

OTHER PUBLICATIONS

JP 2013135501 A English Summary.*

*Primary Examiner* — John R Olszewski
*Assistant Examiner* — Jeffrey Boomer
(74) *Attorney, Agent, or Firm* — Kenyon & Kenyon LLP

(57) ABSTRACT

A two-wheeled inverted pendulum vehicle includes: single-winding first and second motors respectively rotating one of two wheels; first and second control systems respectively supplying drive currents to the first and second motors; a sensor detecting a physical quantity that varies with a turn of the vehicle; a dynamic brake unit being able to switch between active and inactive states of dynamic brake being applied to the first motor; and a control unit, when the control unit has determined that the vehicle is turning about the second motor side on the basis of the physical quantity while supply of drive current from the first control system to the first motor is inhibited, activating dynamic brake in the dynamic brake unit. The first control system, when an abnormality has been detected in the first control system, inhibits supply of drive current from the first control system to the first motor.

5 Claims, 17 Drawing Sheets

(51) Int. Cl.
  *B60L 3/10* (2006.01)
  *B60L 3/00* (2006.01)
  *B60L 15/20* (2006.01)
  *B60T 8/1755* (2006.01)
  *B60W 30/188* (2012.01)
  *G06F 17/10* (2006.01)
  *B60L 11/18* (2006.01)

(56) References Cited

U.S. PATENT DOCUMENTS

2009/0051136 A1\* 2/2009 Yamada et al. ............... 280/205
2010/0030441 A1\* 2/2010 Kosaka ........................... 701/70
2010/0174476 A1\* 7/2010 Fuwa ............................ 701/124
2011/0035101 A1\* 2/2011 Kawada et al. ................ 701/36
2011/0282532 A1\* 11/2011 Kosaka et al. ................. 701/22
2012/0158208 A1\* 6/2012 Kawamoto et al. ............. 701/1
2013/0030636 A1 1/2013 Sugata

FOREIGN PATENT DOCUMENTS

JP  2013-255358 A  12/2013
WO  2011125117 A1  10/2011

\* cited by examiner

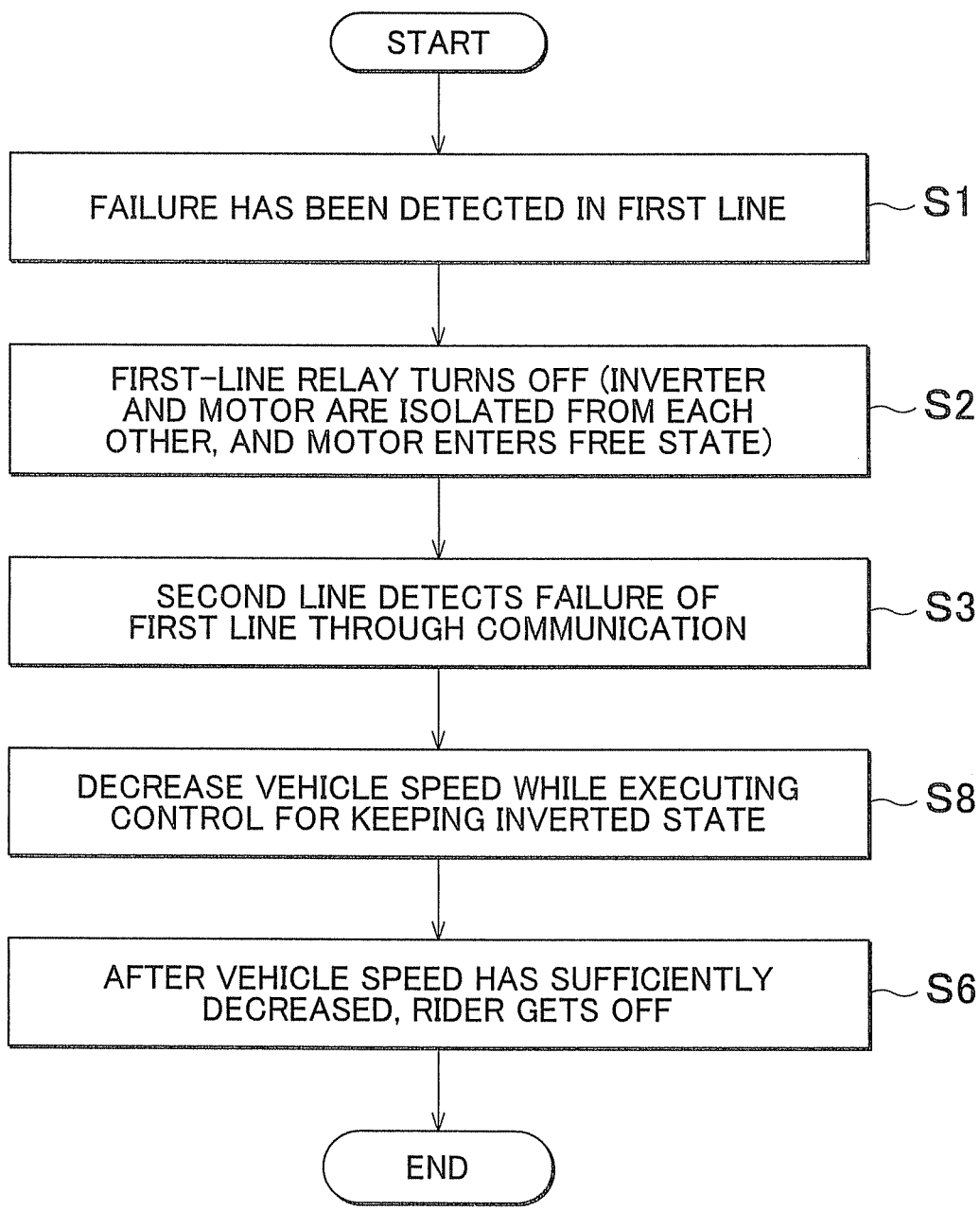

TWO-WHEELED INVERTED PENDULUM VEHICLE AND CONTROL METHOD THEREFOR

INCORPORATION BY REFERENCE

The disclosure of Japanese Patent Application No. 2012-188417 filed on Aug. 29, 2012 including the specification, drawings and abstract is incorporated herein by reference in its entirety.

BACKGROUND OF THE INVENTION

1. Field of the Invention

The invention relates to a two-wheeled inverted pendulum vehicle and a control method therefor and, more particularly, to a technique for controlling a two-wheeled inverted pendulum vehicle in which a control system is duplexed.

2. Description of Related Art

In a vehicle described in Japanese Patent Application Publication No. 2009-187561 (JP 2009-187561 A), a motor has a plurality of redundant windings, and the motor is allowed to be driven from a plurality of power amplifier control units. The vehicle includes the plurality of power amplifier control units and a plurality of processors connected to the plurality of power amplifier control units via a system bus. Thus, the control system is multiplexed. If any one of the processors fails, the vehicle is controlled on the basis of an output of the processor other than the failed processor. However, when the motor has multiple windings as described above, cost increases.

The applicant of the present application found problems described below at the time of studying a two-wheeled inverted pendulum vehicle that provides a reduction in cost. The following description was newly studied by the applicant of the present application, and is not the one illustrating an existing art.

FIG. 15 is a block diagram that shows the configuration of a control system in a two-wheeled inverted pendulum vehicle 400 in which motors 407, 408 each have a single winding and the control system is duplexed into a first-line control system and a second-line control system. FIG. 16 is a view of the schematic configuration of the two-wheeled inverted pendulum vehicle 400 in the case where the motors 407, 408 each have a single winding and the control system is duplexed into the first-line control system and the second-line control system.

As shown in FIG. 16, the motors 407, 408 are respectively controllable from only the control systems corresponding to the motors 407, 408 between the duplexed control systems. Microcontrollers 401, 402 respectively control the motors 407, 408 via inverters 403, 404 so as to keep an inverted state on the basis of outputs from attitude angle sensors 411, 412. The microcontrollers 401, 402 respectively control the motors 407, 408 in a feedback manner on the basis of outputs from rotation angle sensors 409, 410.

The operation of the two-wheeled inverted pendulum vehicle 400 in the case where there occurs a failure in one of the control systems in the above configuration will be described with reference to the flowchart shown in FIG. 17. Here, description will be made on the case where the first-line control system has failed between the first-line control system and the second-line control system.

When the first-line microcontroller 401 has detected a failure in the first-line control system (S101), the first-line microcontroller 401 turns off a first-line relay 405 (S102). That is, the first-line inverter 403 is isolated from the motor 407, and the motor 407 enters a free state. The first-line microcontroller 401 outputs information about the failure of the first-line control system to the second-line microcontroller 402.

The second-line microcontroller 402 detects the failure of the first-line control system on the basis of the information from the first-line microcontroller 401 (S103). When the second-line microcontroller 402 has detected the failure of the first-line control system, the second-line microcontroller 402 controls the motor 408 via the inverter 404 such that the vehicle speed of the two-wheeled inverted pendulum vehicle 400 is decreased. That is, it is possible to stop the two-wheeled inverted pendulum vehicle while executing inverted control over the two-wheeled inverted pendulum vehicle from the remaining control system. However, in this case, inverted control over the two-wheeled inverted pendulum vehicle 400 is executed by driving only the motor 408 from the second-line control system. Therefore, the body of the two-wheeled inverted pendulum vehicle 400 turns about an axis that coincides with the free first-line motor 407 (S104). After the vehicle speed of the two-wheeled inverted pendulum vehicle has sufficiently decreased, a rider of the two-wheeled inverted pendulum vehicle is allowed to get off (S105).

In this way, in the case where the motors 407, 408 each merely have a single winding to have a simplified configuration in order to reduce cost, if there occurs a failure in one of the control systems and, accordingly, the two-wheeled inverted pendulum vehicle is caused to stop, the two-wheeled inverted pendulum vehicle turns. That is, it is not possible to keep straight line stability, with the result that it is not possible to cause the two-wheeled inverted pendulum vehicle to stably travel and bring the vehicle to a stop state. However, in the two-wheeled inverted pendulum vehicle, it is required to ensure the stability of control.

SUMMARY OF THE INVENTION

The invention provides a two-wheeled inverted pendulum vehicle and a control method therefor, which are able to keep straight line stability even with a configuration that motors each have a single winding in order to reduce cost.

A first aspect of the invention provides a two-wheeled inverted pendulum vehicle. The two-wheeled inverted pendulum vehicle includes: a single-winding first motor and a single-winding second motor configured to respectively rotate one of two wheels; a first control system and a second control system configured to respectively supply drive currents to the first motor and the second motor; a sensor configured to detect a physical quantity that varies with a turn of the two-wheeled inverted pendulum vehicle; a dynamic brake unit configured to be able to switch between an active state where dynamic brake is applied to the first motor and an inactive state where dynamic brake is not applied to the first motor; and a control unit configured to, when the control unit has determined that the two-wheeled inverted pendulum vehicle is turning about the second motor side on the basis of the physical quantity detected by the sensor while supply of drive current from the first control system to the first motor is inhibited, activate dynamic brake in the dynamic brake unit. The first control system is configured to, when an abnormality has been detected in the first control system, inhibit supply of drive current from the first control system to the first motor.

A second aspect of the invention provides a two-wheeled inverted pendulum vehicle. The two-wheeled inverted pendulum vehicle includes: a single-winding first motor and a single-winding second motor configured to respectively rotate one of two wheels; a first control system and a second control system configured to respectively supply drive currents to the first motor and the second motor; a relay configured to be able to switch whether to supply drive current from the second control system to not only the second motor but also the first motor; and a control unit configured to, when supply of drive current from the first control system to the first motor is inhibited, switch the relay such that drive current from the second control system is also supplied to the first motor. When an abnormality has been detected in the first control system, supply of drive current from the first control system to the first motor is inhibited.

A third aspect of the invention provides a two-wheeled inverted pendulum vehicle. The two-wheeled inverted pendulum vehicle includes: a single-winding first motor and a single-winding second motor configured to respectively rotate one of two wheels; a first control system and a second control system configured to respectively supply drive currents to the first motor and the second motor; and a differential suppressing device configured to couple an output shaft of the first motor to an output shaft of the second motor. When an abnormality has been detected in the first control system, supply of drive current from the first control system to the first motor is inhibited.

A fourth aspect of the invention provides a control method for a two-wheeled inverted pendulum vehicle including: a single-winding first motor and a single-winding second motor configured to respectively rotate one of two wheels; and a first control system and a second control system configured to respectively supply drive currents to the first motor and the second motor. The control method includes: when an abnormality has been detected in the first control system, inhibiting supply of drive current from the first control system to the first motor; detecting a physical quantity that varies with a turn of the two-wheeled inverted pendulum vehicle; determining whether the two-wheeled inverted pendulum vehicle is turning about the second motor side on the basis of the detected physical quantity; and, when it is determined that the two-wheeled inverted pendulum vehicle is turning about the second motor, applying dynamic brake to the first motor.

A fifth aspect of the invention provides a control method for a two-wheeled inverted pendulum vehicle including: a single-winding first motor and a single-winding second motor configured to respectively rotate one of two wheels; and a first control system, and a second control system configured to respectively supply drive currents to the first motor and the second motor. The control method includes: when an abnormality has been detected in the first control system, inhibiting supply of drive current from the first control system to the first motor; and switching a connection state between the second control system and the first motor such that drive current from the second control system is supplied to not only the second motor but also the first motor.

According to the above-described aspects of the invention, it is possible to provide the two-wheeled inverted pendulum vehicle and the control method therefor, which are able to keep straight line stability even with a configuration that motors each have a single winding in order to reduce cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a flowchart that shows a control process for the two-wheeled inverted pendulum vehicle according to the third embodiment of the invention;

DETAILED DESCRIPTION OF EMBODIMENTS

First Embodiment of the Invention

Figure 1:
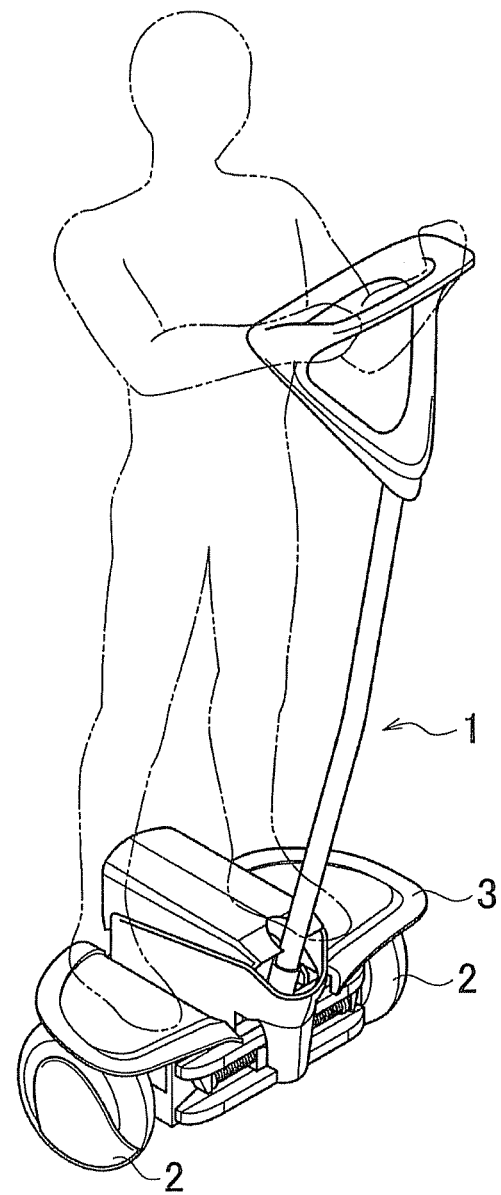
FIG. 1 is a view that shows the schematic configuration of a two-wheeled inverted pendulum vehicle according to a first embodiment of the invention.

A first embodiment of the invention will be described. A two-wheeled inverted pendulum vehicle 1 according to the first embodiment of the invention will be described with reference to FIG. 1. FIG. 1 is a view that shows the schematic configuration of the two-wheeled inverted pendulum vehicle 1 according to the first embodiment of the invention.

The two-wheeled inverted pendulum vehicle 1 detects the attitude angle of the two-wheeled inverted pendulum vehicle 1 in a front-to-rear direction with the use of a sensor at the time when a rider riding on a step plate 3 has applied a load in the front-to-rear direction of the two-wheeled inverted pendulum vehicle 1. The two-wheeled inverted pendulum vehicle 1 controls motors for respectively driving right and left wheels 2 on the basis of the detected attitude angle in order to keep an inverted state of the two-wheeled inverted pendulum vehicle 1. That is, when the rider riding on the step plate 3 applies a load forward to incline the two-wheeled inverted pendulum vehicle 1 forward, the two-wheeled inverted pendulum vehicle 1 controls the motors for driving the right and left wheels 2 so as to accelerate forward in order to keep the inverted state of the two-wheeled inverted pendulum vehicle 1. When the rider applies a load rearward to incline the two-wheeled inverted pendulum vehicle 1 rearward, the two-wheeled inverted pendulum vehicle 1 controls the motors for driving the right and left wheels 2 so as to accelerate rearward in order to keep the inverted state of the two-wheeled inverted pendulum vehicle 1. The two-wheeled inverted pendulum vehicle 1 includes duplexed control systems for controlling the motors in order to ensure the stability of control.

Control over these motors is executed by a control device 10 mounted on the two-wheeled inverted pendulum vehicle 1. The control device 10 will be described later with reference to FIG. 2.

Figure 2:
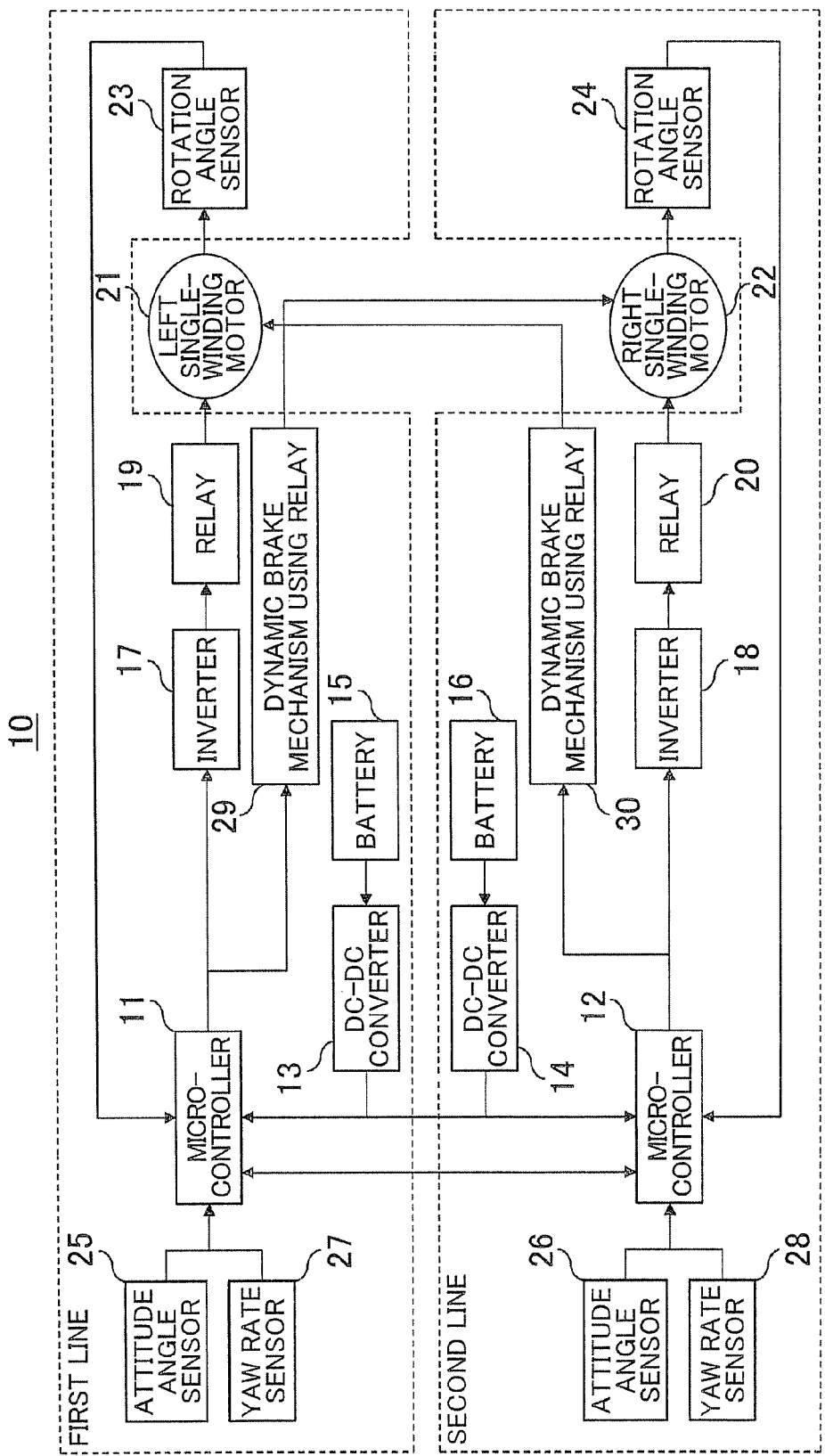
FIG. 2 is a block diagram that shows the configuration of a control device according to the first embodiment of the invention.

Subsequently, the configuration of the control device 10 according to the first embodiment of the invention will be described with reference to FIG. 2. FIG. 2 is a block diagram that shows the configuration of the control device 10 according to the first embodiment of the invention.

The control device 10 includes microcontrollers 11, 12, DC-DC converters 13, 14, batteries 15, 16, inverters 17, 18, relays 19, 20, motors 21, 22, rotation angle sensors 23, 24, attitude angle sensors 25, 26, yaw rate sensors 27, 28 and dynamic brake mechanisms 29, 30.

The control device 10 is a duplexed system that is duplexed into a first-line control system and a second-line control system in order to ensure the stability of control over the two-wheeled inverted pendulum vehicle 1. The first-line control system includes the microcontroller 11, the DC-DC converter 13, the battery 15, the inverter 17, the relay 19, the rotation angle sensor 23, the attitude angle sensor 25, the yaw rate sensor 27 and the dynamic brake mechanism 29. The first-line control system executes drive control over the motor 21. The second-line control system includes the microcontroller 12, the DC-DC converter 14, the battery 16, the inverter 18, the relay 20, the rotation angle sensor 24, the attitude angle sensor 26, the yaw rate sensor 28 and the dynamic brake mechanism 30. The second-line control system executes drive control over the motor 22.

Each of the microcontrollers 11, 12 is an electronic control unit (ECU) that controls the corresponding one of the motors 21, 22 in order to keep the inverted state as described above on the basis of an attitude angle signal that is output from the corresponding one of the attitude angle sensors 25, 26. Each of the microcontrollers 11, 12 includes a central processing unit (CPU) and a storage unit. Each of the microcontrollers 11, 12 executes a process of each of the microcontrollers 11, 12 in the present embodiment by executing a program stored in the corresponding storage unit. That is, the program stored in the storage unit of each of the microcontrollers 11, 12 includes a code for causing the CPU to execute the process in each of the microcontrollers 11, 12 in the present embodiment. Each of the storage units is, for example, configured to include any storage device that is able to store the program and various pieces of information that are utilized in a process that is executed in the CPU. The storage device is, for example, a memory, a hard disk drive, or the like.

The microcontroller 11 outputs a command value for controlling the motor 21 to the inverter 17. The microcontroller 11 switches between an active state where dynamic brake of the dynamic brake mechanism 29 is applied to the motor 22 and an inactive state where dynamic brake of the dynamic brake mechanism 29 is not applied to the motor 22. Specifically, the microcontroller 11 outputs a switch instruction signal for instructing application of dynamic brake to the motor 22 to switch off or on to the dynamic brake mechanism 29. The microcontroller 12 outputs a command value for controlling the motor 22 to the inverter 18. The microcontroller 12 switches between an active state where dynamic brake of the dynamic brake mechanism 30 is applied to the motor 21 and an inactive state where dynamic brake of the dynamic brake mechanism 30 is not applied to the motor 21. Specifically, the microcontroller 12 outputs a switch instruction signal for instructing application of dynamic brake to the motor 21 to switch off or on to the dynamic brake mechanism 30.

Here, the microcontroller 11 generates a command value for the inverter 17 so as to control the motor 21 in a feedback manner on the basis of a rotation angle signal that is output from the rotation angle sensor 23. The rotation angle signal indicates the rotation angle of the motor 21. The microcontroller 12 generates a command value for the inverter 18 so as to control the motor 22 in a feedback manner on the basis of a rotation angle signal that is output from the rotation angle sensor 24. The rotation angle signal indicates the rotation angle of the motor 22.

The microcontroller 11 operates on electric power that is supplied from the DC-DC converter 13. In addition, the microcontroller 12 operates on electric power that is supplied from the DC-DC converter 14.

The DC-DC converter 13 converts the voltage of electric power, which is supplied from the battery 15, to a voltage suitable for being supplied to the microcontroller 11, and supplies the electric power to the microcontroller 11. The DC-DC converter 14 converts the voltage of electric power, which is supplied from the battery 16, to a voltage suitable for being supplied to the microcontroller 12, and supplies the electric power to the microcontroller 12.

Each of the batteries 15, 16 supplies the control device 10 with electric power required to operate the control device 10. Specifically, the battery 15 supplies DC-DC converter 13 with electric power required to operate the microcontroller 11. In addition, the battery 16 supplies the DC-DC converter 14 with electric power required to operate the microcontroller 12.

The inverter 17 generates drive currents for driving the motor 21 from electric power that is supplied from the battery 15 by executing pulse width modulation (PWM) control on the basis of the command value output from the microcontroller 11. The drive currents are supplied to the motor 21 via the relay 19. The inverter 18 generates driving currents for driving the motor 22 from electric power that is supplied from the battery 15 by executing PWM control on the basis of the command value output from the microcontroller 12. The drive currents are supplied to the motor 22 via the relay 20.

The relay 19 isolates the inverter 17 and the motor 21 from each other in response to control from the microcontroller 11, which is executed when an abnormality in the first-line control system has been detected by the microcontroller 11. The relay 20 isolates the inverter 18 and the motor 22 from each other in response to control from the microcontroller 12, which is executed when an abnormality in the second-line control system has been detected by the microcontroller 12. In this way, by isolating the control system having an abnormality from the motor 21 or the motor 22, erroneous control is suppressed, and safety is ensured in control. Any abnormality may be set as the abnormality in the control system. The abnormality in the control system is, for example, an abnormality due to which the control system is not able to normally control the motor 21 or the motor 22, such as a failure of a component in the control system and a software error of the microcontroller 11 or the microcontroller 12.

Each of the motors 21, 22 is a single-winding motor. The motor 21 is driven by drive currents that are supplied from the inverter 17 via the relay 19. By driving the motor 21, torque is applied from the motor 21 to the left wheel 2, and the left wheel 2 rotates. The motor 22 is driven by drive currents that are supplied from the inverter 18 via the relay 20. By driving the motor 22, torque is applied from the motor 22 to the right wheel 2, and the right wheel 2 rotates.

The rotation angle sensor 23 detects the rotation angle of the motor 21, generates a rotation angle signal that indicates the detected rotation angle, and outputs the rotation angle signal to the microcontroller 11. The rotation angle sensor 24 detects the rotation angle of the motor 22, generates a rotation angle signal that indicates the detected rotation angle, and, outputs the rotation angle signal to the microcontroller 12.

Each of the attitude angle sensors 25, 26 detects the attitude angle in the front-to-rear direction of the two-wheeled inverted pendulum vehicle 1 at the time when the rider has applied a load to the step plate 3 in the front-to-rear direction of the two-wheeled inverted pendulum vehicle 1. Each of the attitude angle sensors 25, 26 outputs an attitude angle signal that indicates the detected attitude angle to a corresponding one of the microcontrollers 11, 12. Each of the attitude angle sensors 25, 26 is, for example, formed of an acceleration sensor and a gyro sensor so as to detect the attitude angle of the two-wheeled inverted pendulum vehicle 1.

Each of the yaw rate sensors 27, 28 detects the yaw rate of the two-wheeled inverted pendulum vehicle 1. Each of the yaw rate sensors 27, 28 outputs a yaw rate signal that indicates the detected yaw rate to a corresponding one of the microcontrollers 11, 12. Each of the yaw rate sensors 27, 28 is, for example, formed of a gyro sensor so as to detect the yaw rate (angular velocity) of the two-wheeled inverted pendulum vehicle 1.

The dynamic brake mechanism 29 applies dynamic brake to the motor 22 in response to a switch instruction signal that is output from the microcontroller 11 and that instructs dynamic brake to switch on. In addition, the dynamic brake mechanism 29 releases dynamic brake from the motor 22 in response to a switch instruction signal that is output from the microcontroller 11 and that instructs dynamic brake to switch off.

The dynamic brake mechanism 30 applies dynamic brake to the motor 21 in response to a switch instruction signal that is output from the microcontroller 12 and that instructs dynamic brake to switch, on. In addition, the dynamic brake mechanism 30 releases dynamic brake from the motor 21 in response to a switch instruction signal that is output from the microcontroller 12 and that instructs dynamic brake to switch off.

In the first embodiment, with the above-described configuration, dynamic brake is applied by the dynamic brake mechanism 29 or the dynamic brake mechanism 30 to the motor 22 or the motor 21, which is not supplied with drive currents and is in a free state by being isolated from the abnormal control system. In this way, the two-wheeled inverted pendulum vehicle 1 is controlled so as to keep the straight line stability of the two-wheeled inverted pendulum vehicle 1. Thus, it is possible to cause the two-wheeled inverted pendulum vehicle 1 to stably travel and bring the vehicle 1 to a stop state while keeping the straight line stability of the two-wheeled inverted pendulum vehicle 1.

Figure 3:
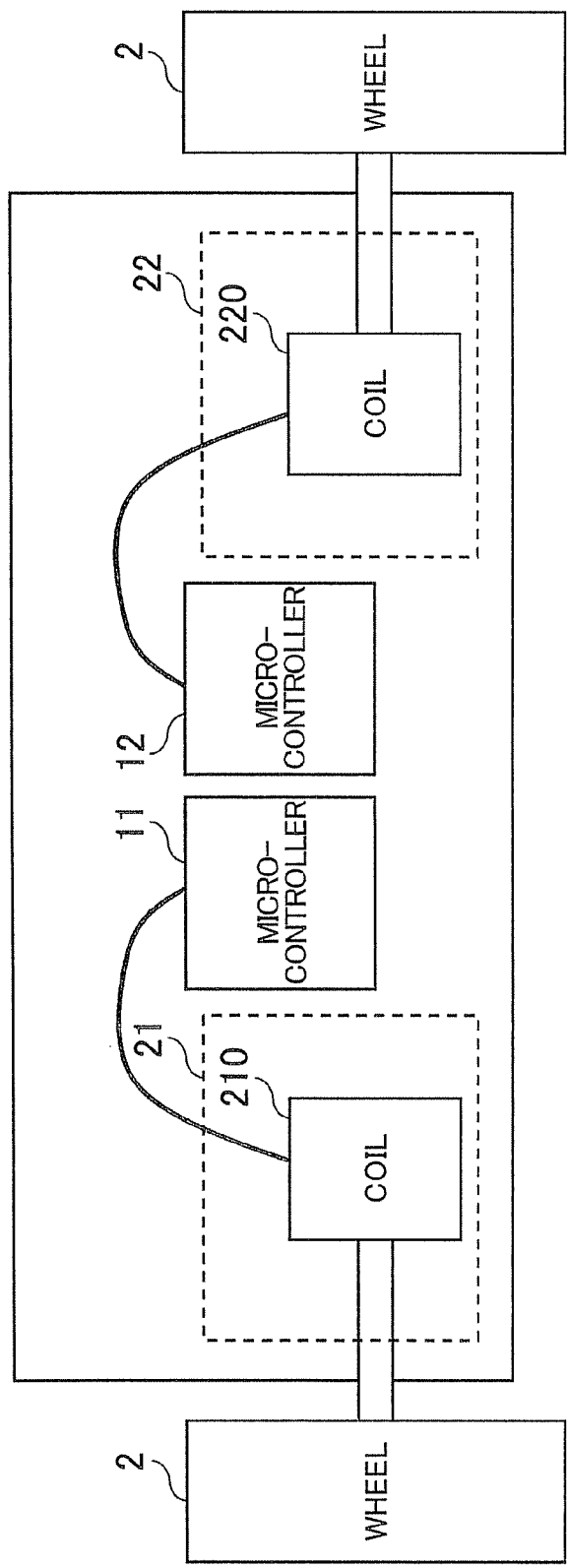
FIG. 3 is a view that shows the schematic structure of the inside of the two-wheeled inverted pendulum vehicle according to the first embodiment of the invention.

Subsequently, the schematic structure of the inside of the two-wheeled inverted pendulum vehicle 1 according to the first embodiment of the invention will be described with reference to FIG. 3. FIG. 3 is a view that shows the schematic structure of the inside of the two-wheeled inverted pendulum vehicle 1 according to the first embodiment of the invention.

Each of the motors 21, 22 has a single winding as described above. Specifically, the motor 21 includes a single-winding coil 210, and the motor 22 includes a single-winding coil 220. The motor 21 is driven by drive currents that are supplied to the coil 210 by the microcontroller 11. The motor 22 is driven by drive currents that are supplied to the coil 220 by the microcontroller 12. In this way, the motors 21, 22 according to the present embodiment are of a single-winding type, so it is possible to reduce the cost of the two-wheeled inverted pendulum vehicle 1 as compared to the case where multiple-winding motors are used.

Figure 4:
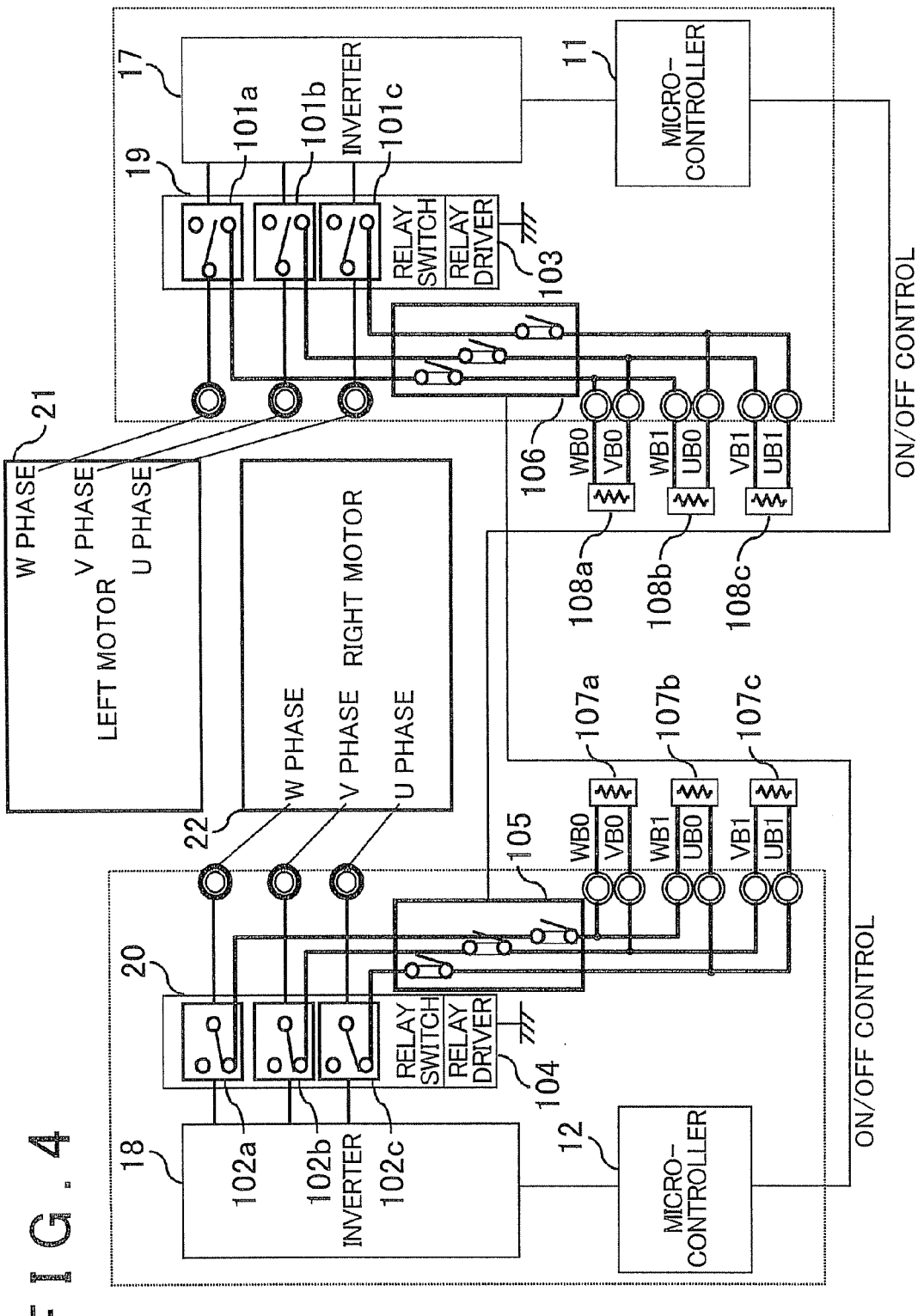
FIG. 4 is a configuration view of relays and dynamic brake mechanisms according to the first embodiment of the invention.

Subsequently, the configuration of the relays 19, 20 and dynamic brake mechanisms 29, 30 according to the first embodiment of the invention will be described with reference to FIG. 4. FIG. 4 is a configuration view of the relays 19, 20 and dynamic brake mechanisms 29, 30 according to the first embodiment of the invention.

The relay 19 includes relay switches 101a to 101c and a relay driver 103. Hereinafter, the relay switches 101a to 101c are also collectively referred to as relay switches 101.

The relay switches 101a to 101c are switches that are able to switch between a connected state where the inverter 17 is connected to the motor 21 and drive currents that are output from the inverter 17 are respectively allowed to be supplied to the W phase, V phase and U phase of the motor 21 and a disconnected state where the inverter 17 is disconnected from the motor 21 and drive currents that are output from the inverter 17 are not respectively allowed to be supplied to the W phase, V phase and U phase of the motor 21.

The relay driver 103 switches the relay switches 101a to 101c in response to a switch instruction signal that is output from the microcontroller 11 and that instructs the relay 19 to switch. Specifically, the microcontroller 11 outputs a switch instruction signal, which indicates instructions for switching to the connected state, to the relay driver 103 before supplying drive currents to the motor 21. The relay driver 103 switches the relay switches 101a to 101c to the connected state in response to the switch instruction signal that is output from the microcontroller 11 and that indicates instructions for switching to the connected state. In addition, when the microcontroller 11 has detected an abnormality in the first-line control system to which the microcontroller 11 belongs, the microcontroller 11 outputs a switch instruction signal, which indicates instructions for switching to the disconnected state, to the relay driver 103. The relay driver 103 switches the relay switches 101a to 101c to the disconnected state in response to the switch instruction signal that is output from the microcontroller 11 and that indicates instructions for switching to the disconnected state. Thus, the first-line inverter 17 and the motor 21 are isolated from each other, and the motor 21 enters a free state where drive currents are not supplied.

The relay 20 includes relay switches 102a to 102c and a relay driver 104. Hereinafter, the relay switches 102a to 102c are also collectively referred to as relay switches 102.

The relay switches 102a to 102c are switches that are able to switch between a connected state where the inverter 18 is connected to the motor 22 and drive currents that are output from the inverter 18 are respectively allowed to be supplied to the W phase, V phase and U phase of the motor 22 and a disconnected state where the inverter 18 is disconnected from the motor 22 and drive currents that are output from the inverter 18 are not respectively allowed to be supplied to the W phase, V phase and U phase of the motor 22.

The relay driver 104 switches the relay switches 102a to 102c in response to a switch instruction signal that is output from the microcontroller 12 and that instructs the relay 20 to switch. Specifically, the microcontroller 12 outputs a switch instruction signal, which indicates instructions for switching to the connected state, to the relay driver 104 before supplying drive currents to the motor 22. The relay driver 104 switches the relay switches 102a to 102c to the connected state in response to the switch instruction signal that is output from the microcontroller 12 and that indicates instructions for switching to the connected state. In addition, when the microcontroller 12 has detected an abnormality in the second-line control system to which the microcontroller 12 belongs, the microcontroller 12 outputs a switch instruction signal, which indicates instructions for switching to the disconnected state, to the relay driver 104. The relay driver 104 switches the relay switches 102a to 102c to the disconnected state in response to the switch instruction signal that is output from the microcontroller 12 and that indicates instructions for switching to the disconnected state. Thus, the second-line inverter 18 and the motor 22 are isolated from each other, and the motor 22 enters a free state where drive currents are not supplied.

The dynamic brake mechanism 29 includes a relay 105 and dynamic brake resistors 107a to 107c. Hereinafter, the dynamic brake resistors 107a to 107c are also collectively referred to as dynamic brake resistors 107.

The relay 105 switches between a connected state where the motor 22 is connected to the dynamic brake resistors 107a to 107c and a disconnected state where the motor 22 is disconnected from the dynamic brake resistors 107a to 107c in response to a switch instruction signal that is output from the microcontroller 11 and that instructs the relay 105 to switch.

Specifically, when the microcontroller 11 applies dynamic brake to the motor 22, the microcontroller 11 outputs a switch instruction signal, which indicates instructions for switching to the connected state, to the relay 105. The relay 105 switches to the connected state in response to the switch instruction signal that is output from the microcontroller 11 and that indicates instructions for switching to the connected state. Here, the relay 105 is switched between a connected state and a disconnected state with respect to the side at which the relay switches 102a to 102c are switched to the disconnected state with respect to the inverter 18. That is, when the relay switches 102a to 102c are switched to the disconnected state with respect to the inverter 18, the motor 22 is connected to the dynamic brake resistors 107a to 107c by switching the relay 105 to the connected state. As a result, dynamic brake is applied to the motor 22. In addition, when the microcontroller 11 releases dynamic brake being applied to the motor 22, the microcontroller 11 outputs a switch instruction signal, which indicates instructions for switching to the disconnected state, to the relay 105. The relay 105 switches to the disconnected state in response to the switch instruction signal that is output from the microcontroller 11 and that indicates instructions for switching to the disconnected state.

The dynamic brake mechanism 30 includes a relay 106 and dynamic brake resistors 108a to 108c. Hereinafter, the dynamic brake resistors 108a to 108c are also collectively referred to as dynamic brake resistors 108.

The relay 106 switches between a connected state where the motor 21 is connected to the dynamic brake resistors 108a to 108c and a disconnected state where the motor 21 is disconnected from the dynamic brake resistors 108a to 108c in response to a switch instruction signal that is output from the microcontroller 12 and that instructs the relay 106 to switch.

Specifically, when the microcontroller 12 applies dynamic brake to the motor 21, the microcontroller 12 outputs a switch instruction signal, which indicates instructions for switching to the connected state, to the relay 106. The relay 106 switches to the connected state in response to the switch instruction signal that is output from the microcontroller 12 and that indicates instructions for switching to the connected state. Here, the relay 106 is switched between a connected state and a disconnected state with respect to the side at which the relay switches 101a to 101c are switched to the disconnected state with respect to the inverter 17. That is, when the relay switches 101a to 101c are switched to the disconnected state with respect to the inverter 17, the motor 21 is connected to the dynamic brake resistors 108a to 108c by switching the relay 106 to the connected state. As a result, dynamic brake is applied to the motor 21. In addition, when the microcontroller 12 releases dynamic brake being applied to the motor 21, the microcontroller 12 outputs a switch instruction signal, which indicates instructions for switching to the disconnected state, to the relay 106. The relay 106 switches to the disconnected state in response to the switch instruction signal that is output from the microcontroller 12 and that indicates instructions for switching to the disconnected state.

Here, strictly speaking, each of the relays 105, 106, as well as the relays 19, 20, includes three relay switches that connect or disconnect the phases of the motor 21 or the motor 22 to or from the dynamic brake resistors 107a to 107c or the dynamic brake resistors 108a to 108c and a relay driver that switches those relay switches. The relay driver switches the relay switches in response to a switch instruction signal from the microcontroller 11, thus switching between the connected state and the disconnected state between the motor 22 and the dynamic brake resistors 107. The relay driver switches the relay switches in response to a switch instruction signal from the microcontroller 12, thus switching between the connected state and the disconnected state between the motor 21 and the dynamic brake resistors 108. The operation is similar to the operation in the relay 19 or the relay 20, so the detailed description is omitted.

In the first embodiment, with the above-described configuration, when the rotation speed of the motor that is in a free state as a result of detection of an abnormality in the corresponding control system is increased and, accordingly, the two-wheeled inverted pendulum vehicle 1 turns about the live motor side, it is possible to inhibit a turn of the two-wheeled inverted pendulum vehicle 1 by applying dynamic brake to the free motor. Thus, in the configuration that the single-winding motors are used in order to reduce cost, even when there occurs an abnormality in any one of the control systems and part of the functions of the any one of the control systems are restricted, it is possible to cause the two-wheeled inverted pendulum vehicle 1 to stably travel and bring the two-wheeled inverted pendulum vehicle 1 to a stop state while keeping the straight line stability of the two-wheeled inverted pendulum vehicle 1.

Figure 5:
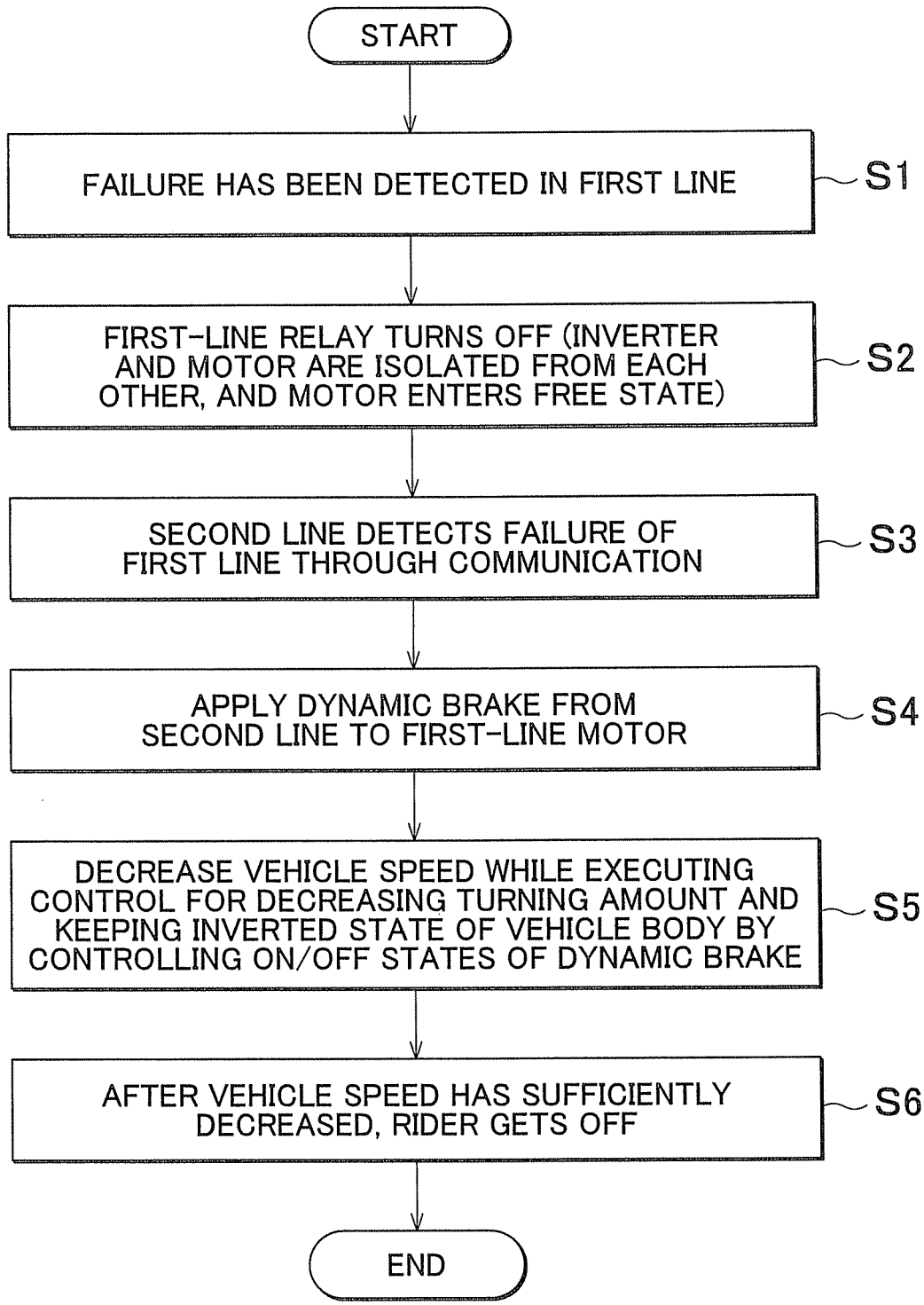
FIG. 5 is a flowchart that shows a control process for the two-wheeled inverted pendulum vehicle according to the first embodiment of the invention.

Subsequently, a control process for the two-wheeled inverted pendulum vehicle 1 according to the first embodiment of the invention will be described with reference to FIG. 5. FIG. 5 is a flowchart that shows the control process for the two-wheeled inverted pendulum vehicle 1 according to the first embodiment of the invention.

When the microcontroller 11 has detected an abnormality in the first-line control system (S1), the microcontroller 11 turns off the first-line relay 19 (S2). Specifically, the microcontroller 11 outputs the switch instruction signal, which indicates instructions for switching to the connected state, to the relay 19. The relay 19 enters the disconnected state in response to the switch instruction signal that is output from the microcontroller 11 and that indicates instructions for switching to the disconnected state. That is, the relay 19 isolates the inverter 17 and the motor 21 from each other. Thus, the motor 21 enters a free state.

The microcontroller 11 outputs notification information that an abnormality has been detected in the first-line control system, to the microcontroller 12. The microcontroller 12 detects that an abnormality has occurred in the first-line control system on the basis of the notification information from the microcontroller 11 (S3).

The microcontroller 12 applies dynamic brake to the first-line motor 21 upon detection of the abnormality in the first-line control system (S4). Specifically, the microcontroller 12 outputs the switch instruction signal, which indicates instructions for switching to the connected state, to the dynamic brake mechanism 30. The dynamic brake mechanism 30 applies dynamic brake to the motor 21 in response to the switch instruction signal that is output from the microcontroller 12.

After that, the microcontroller 12 executes control for decreasing the vehicle speed of the two-wheeled inverted pendulum vehicle 1 while executing control for decreasing the turning amount and keeping inverted state of the two-wheeled inverted pendulum vehicle 1 by controlling on/off states of dynamic brake (S5). Further detailed contents of the process will be described later with reference to FIG. 6. Thus, after the vehicle speed of the two-wheeled inverted pendulum vehicle 1 has been sufficiently decreased, the rider is allowed to get off (S6).

Figure 6:
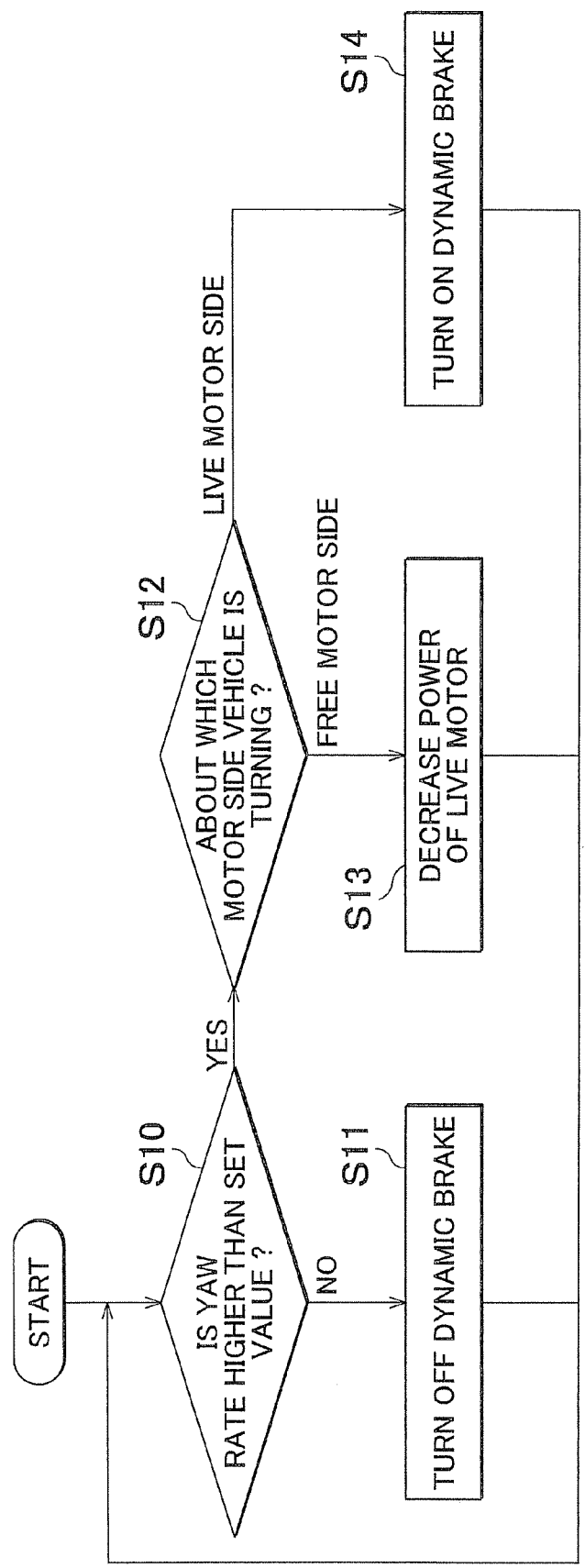
FIG. 6 is a flowchart that shows a straight-ahead driving control process for the two-wheeled inverted pendulum vehicle according to the first embodiment of the invention.

Subsequently, a straight-ahead control process for the two-wheeled inverted pendulum vehicle 1 according to the first embodiment of the invention at the time of occurrence of an abnormality will be described with reference to FIG. 6. FIG. 6 is a flowchart that shows the straight-ahead control process for the two-wheeled inverted pendulum vehicle 1 according to the first embodiment of the invention at the time of occurrence of an abnormality. This process corresponds to step S5 in FIG. 5 as described above. Here, as in the case of the above, description will be made on the assumption that an abnormality has been detected in the first-line control system.

The microcontroller 12 determines whether a yaw rate indicated by the yaw rate signal that is output from the yaw rate sensor 28 is higher than a set value (predetermined threshold) (S10). Any value may be preset for the set value (threshold) here.

When it is determined that the yaw rate is lower than or equal to the set value (No in S10), the microcontroller 12 turns off dynamic brake being applied to the motor 21 (S11). Specifically, the microcontroller 12 outputs the switch instruction signal, which indicates instructions for switching to the disconnected state, to the dynamic brake mechanism 30. The dynamic brake mechanism 30 releases dynamic brake being applied to the motor 21 by disconnecting the motor 21 from the dynamic brake resistors 108 in response to the switch instruction signal that is output from the microcontroller 12 and that indicates instructions for switching to the disconnected state.

When it is determined that the yaw rate is higher than the set value (Yes in S10), the microcontroller 12 determines about which motor side the two-wheeled inverted pendulum vehicle 1 is turning (S12).

When it is determined that the two-wheeled inverted pendulum vehicle 1 is turning about the free motor 21 (free motor side in S12), the microcontroller 12 decreases the output power of the live, non-free motor 22 (S13). Specifically, the microcontroller 12 generates a command value such that the rotation speed of the motor 22 is decreased, and outputs the command value to the inverter 18. The inverter 18 generates drive currents on the basis of the command value output from the microcontroller 12 such that the rotation speed of the motor 22 is decreased, and supplies the drive currents to the motor 22 via the relay 20.

That is, when the two-wheeled inverted pendulum vehicle 1 is turning about the free motor 21, the rotation speed of the free motor 21 is lower than the rotation speed of the live motor 22. For handling the above situation, with step S13, it is possible to decrease the rotation speed of the motor 22 in accordance with the rotation speed of the motor 21, so the straight line stability of the two-wheeled inverted pendulum vehicle 1 is kept.

On the other hand, when it is determined that the two-wheeled inverted pendulum vehicle 1 is turning about the live motor 22 (live motor side in S12), the microcontroller 12 turns on dynamic brake to the free motor 21 (S14). Specifically, the microcontroller 12 outputs the switch instruction signal, which indicates instructions for switching to the connected state, to the dynamic brake mechanism 30. The dynamic brake mechanism 30 applies dynamic brake to the motor 21 by connecting the motor 21 to the dynamic brake resistors 108 in response to the switch instruction signal that is output from the microcontroller 12 and that indicates instruction for switching to the connected state.

That is, when the two-wheeled inverted pendulum vehicle 1 is turning about the live motor 22, the rotation speed of the live motor 22 is lower than the rotation speed of the free motor 21. For handling the above situation, with step S14, it is possible to decrease the rotation speed of the motor 21 together with the rotation speed of the motor 22 through dynamic brake, so it is possible to keep the straight line stability of the two-wheeled inverted pendulum vehicle 1.

In the above-described process, the description is made on the case where an abnormality has been detected in the first-line control system. When an abnormality has been detected in the second-line control system, it is obvious that a similar process is executed in a state where the microcontroller 11 and the microcontroller 12 are interchanged in position, so the description thereof is omitted.

As described above, in the first embodiment, the motors 21, 22 each are of a single-winding type, so it is possible to reduce cost. In addition, it is possible to reduce components (inverter, relay, rotation angle sensor, and the like) corresponding to the omitted winding, so it is possible to reduce cost in this respect.

In addition, in the first embodiment, when supply of drive currents from the first-line control system to the motor 21 is inhibited, and when it is determined that the two-wheeled inverted pendulum vehicle 1 is turning about the live motor 22 on the basis of the physical quantity (yaw rate) detected by the yaw rate sensor 27, the microcontroller 12 activates dynamic brake in the dynamic brake mechanism 30. Thus, even when each of the motors 21, 22 is of a single-winding type in order to reduce cost and is allowed to be driven from any one of the control systems, it is possible to decrease the rotation speed of the motor 21 in accordance with the rotation speed of the motor 22 through dynamic brake, so it is possible to keep the straight line stability of the two-wheeled inverted pendulum vehicle 1. In addition, it is possible to keep the straight line stability through low-cost dynamic brake, so cost does not increase in this respect.

Second Embodiment of the Invention

Subsequently, a second embodiment of the invention will be described. The schematic configuration of the two-wheeled inverted pendulum vehicle 1 in the second embodiment is similar to the schematic configuration of the two-wheeled inverted pendulum vehicle 1 in the first embodiment described with reference to FIG. 1, so the description is omitted.

Figure 7:
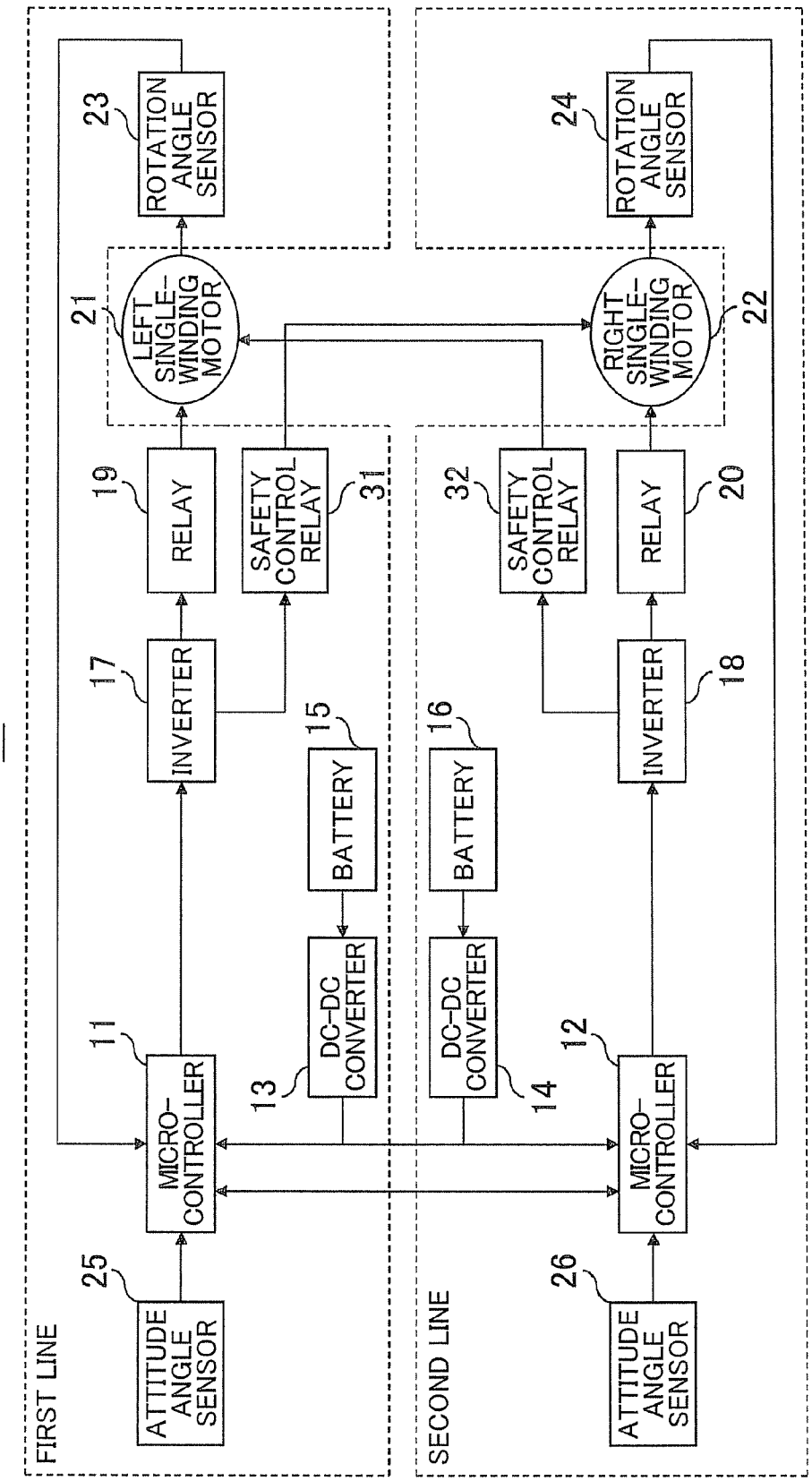
FIG. 7 is a block diagram that shows the configuration of a control device according to a second embodiment of the invention.

Subsequently, the configuration of the control device 10 according to the second embodiment of the invention will be described with reference to FIG. 7. FIG. 7 is a block diagram that shows the configuration of the control device 10 according to the second embodiment of the invention. Hereinafter, the description of contents similar to those of the first embodiment is omitted where appropriate.

In the second embodiment, the control device 10 includes safety control relays 31, 32 instead of the dynamic brake mechanisms 29, 30.

The safety control relay 31 is able to be switched so as to output drive currents that are output from the inverter 17 to the motor 22 in response to control from the second-line microcontroller 12, which is executed when an abnormality has been detected in the first-line control system. The safety control relay 32 is able to be switched so as to output drive currents that are output from the inverter 18 to the motor 21 in response to control from the first-line microcontroller 11, which is executed when an abnormality has been detected in the second-line control system.

In the second embodiment, with the above-described configuration, drive currents are supplied from the other one of the control systems by the safety control relay 31 or the safety control relay 32 to the motor 21 or the motor 22, which is not supplied with drive currents by being isolated from the abnormal control system. In this way, the two-wheeled inverted pendulum vehicle 1 is controlled so as to keep the straight line stability of the two-wheeled inverted pendulum vehicle 1. Thus, the motors 21, 22 are driven at the same rotation speed by the same drive currents, so it is possible to cause the two-wheeled inverted pendulum vehicle 1 to stably travel and bring the two-wheeled inverted pendulum vehicle 1 to a stop state while keeping the straight line stability of the two-wheeled inverted pendulum vehicle 1.

In the second embodiment, the straight line stability of the two-wheeled inverted pendulum vehicle 1 is kept, so the control device 10 may not include the yaw rate sensors 27, 28 that are used to determine whether to apply dynamic brake as shown in FIG. 7.

The schematic structure of the inside of the two-wheeled inverted pendulum vehicle 1 according to the second embodiment is similar to the schematic structure of the inside of the two-wheeled inverted pendulum vehicle 1 according to the first embodiment described with reference to FIG. 3, so the description is omitted.

Figure 8:
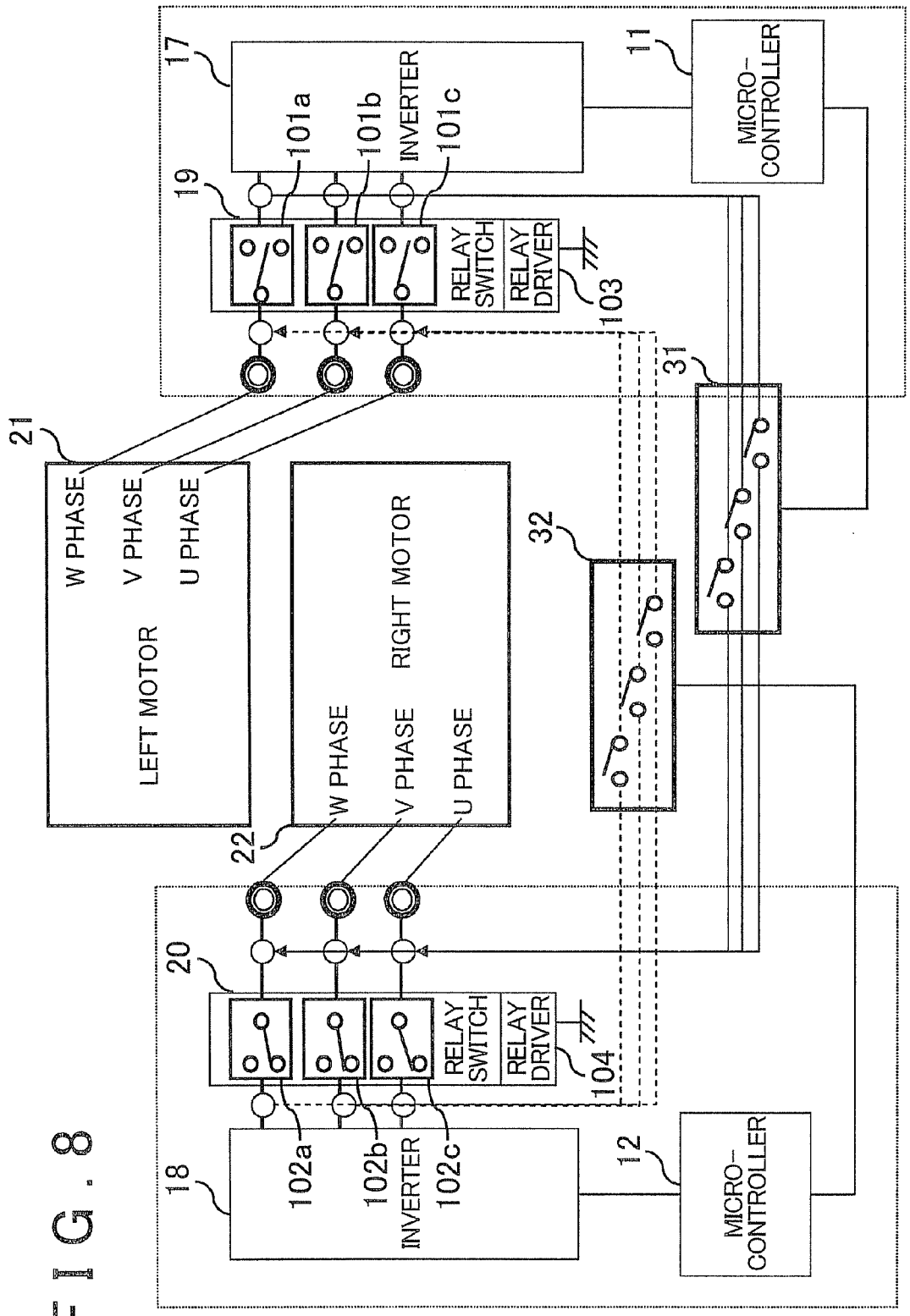
FIG. 8 is a configuration view of relays and safety control relays according to the second embodiment of the invention.

Subsequently, the configuration of the relays 19, 20 and safety control relays 31, 32 according to the second embodiment of the invention will be described with reference to FIG. 8. FIG. 8 is a configuration view of the relays 19, 20 and safety control relays 31, 32 according to the second embodiment of the invention. The relays 19, 20 are similar to those of the first embodiment, so the description is omitted.

The safety control relay 31 switches between a connected state where the motor 22 is connected to the inverter 17 and a disconnected state where the motor 22 is disconnected from the inverter 17 in response to a switch instruction signal that is output from the microcontroller 11 and that instructs the safety control relay 31 to switch. Specifically, when the microcontroller 11 has detected an abnormality in the second-line control system, the microcontroller 11 outputs the switch instruction signal, which indicates instructions for switching to the connected state, to the safety control relay 31. The safety control relay 31 switches to the connected state in response to the switch instruction signal that is output from the microcontroller 11 and that indicates instructions for switching to the connected state. Thus, drive currents that are output from the inverter 17 are also supplied to the motor 22. In addition, when the microcontroller 11 cancels driving of the motor 22 with the use of the first-line inverter 17, the microcontroller 11 outputs the switch instruction signal, which indicates instructions for switching to the disconnected state, to the safety control relay 31. The safety control relay 31 switches to the disconnected state in response to the switch instruction signal that is output from the microcontroller 11 and that indicates instructions for switching to the disconnected state. Thus, drive currents that are output from the inverter 17 are not supplied to the motor 22.

The safety control relay 32 switches between a connected state where the motor 21 is connected to the inverter 18 and a disconnected state where the motor 21 is disconnected from the inverter 18 in response to a switch instruction signal that is output from the microcontroller 12 and that instructs the safety control relay 32 to switch. Specifically, when the microcontroller 12 has detected an abnormality in the first-line control system, the microcontroller 12 outputs the switch instruction signal, which indicates instructions for switching to the connected state, to the safety control relay 32. The safety control relay 32 switches to the connected state in response to the switch instruction signal that is output from the microcontroller 12 and that indicates instructions for switching to the connected state. Thus, drive currents that are output from the inverter 18 are also supplied to the motor 21. In addition, when the microcontroller 12 cancels driving of the motor 21 with the use of the inverter 18, the microcontroller 12 outputs the switch instruction signal, which indicates instructions for switching to the disconnected state, to the safety control relay 32. The safety control relay 32 switches to the disconnected state in response to the switch instruction signal that is output from the microcontroller 12 and that indicates instructions for switching to the disconnected state. Thus, drive currents that are output from the inverter 18 are not supplied to the motor 21.

Here, strictly speaking, each of the safety control relays 31, 32, as well as the relays 19, 20, includes three relay switches that connect or disconnect the phases of the motor 21 or the motor 22 to or from output terminals of drive currents supplied to the phases of the inverter 17 or the inverter 18 and a relay driver that switches those relay switches. The relay driver switches the relay switches in response to a switch instruction signal from the microcontroller 11, thus switching between the connected state and the disconnected state between the motor 22 and the inverter 17. The relay driver switches the relay switches in response to a switch instruction signal from the microcontroller 12, thus switching between the connected state and the disconnected state between the motor 21 and the inverter 18. The operation is similar to the operation in the relay 19 or the relay 20, so the detailed description is omitted.

In the second embodiment, with the above-described configuration, by connecting the motor 21 or the motor 22, isolated from the control system in which an abnormality has been detected, with the use of the safety control relay 32 or the safety control relay 31 to the normal control system in which no abnormality has been detected, it is possible to drive the motor 21 or the motor 22, corresponding to the abnormal control system, as in the case of the motor 22 or the motor 21, corresponding to the normal control system. Thus, all the motors 21, 22 are drive by being supplied with the same drive currents. Therefore, the rotation speeds of the right and left wheels 2 become equal to each other, so it is possible to inhibit a turn of the two-wheeled inverted pendulum vehicle 1. That is, when there occurs a failure in the two-wheeled inverted pendulum vehicle 1, it is possible to cause the two-wheeled inverted pendulum vehicle 1 to stably travel and bring the two-wheeled inverted pendulum vehicle 1 to a stop state, without decreasing the straight line stability of the two-wheeled inverted pendulum vehicle 1 with a low-cost configuration.

Figure 9:
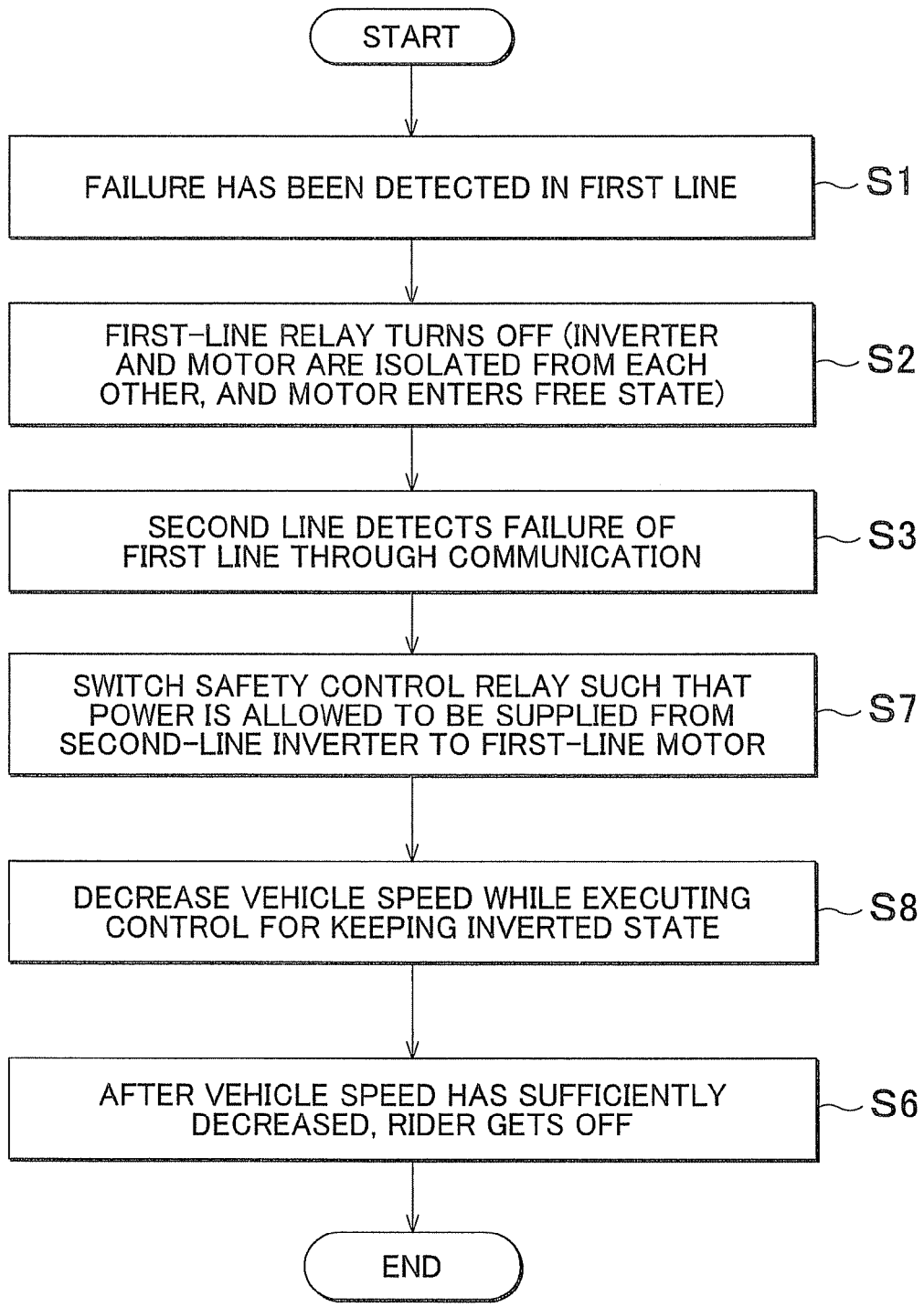
FIG. 9 is a flowchart that shows a control process for the two-wheeled inverted pendulum vehicle according to the second embodiment of the invention.

Subsequently, a control process for the two-wheeled inverted pendulum vehicle 1 according to the second embodiment of the invention will be described with reference to FIG. 9. FIG. 9 is a flowchart that shows the control process for the two-wheeled inverted pendulum vehicle 1 according to the second embodiment of the invention. Like reference numerals denote steps similar to the steps of the control process in the first embodiment described with reference to FIG. 5, and the description thereof is omitted.

Here, description will be made on the case where the microcontroller 12 has detected an abnormality in the first-line control system. When the microcontroller 12 detects the abnormality in the first-line control system (S1 to S3), the microcontroller 12 switches the safety control relay 32 in order to make it possible to transmit power from the second-line inverter 18 to the motor 21 corresponding to the first-line control system (S7). Specifically, the microcontroller 12 outputs the switch instruction signal, which indicates instructions for switching to the connected state, to the safety control relay 32. The safety control relay 32 switches to the connected state in response to the switch instruction signal that is output from the microcontroller 12 and that indicates instructions for switching to the connected state. Thus, drive currents that are output from the second-line inverter 18 are output to not only the motor 22 but also the motor 21.

The microcontroller 12 controls the motors 21, 22 for decreasing the vehicle speed of the two-wheeled inverted pendulum vehicle 1 while keeping the inverted state of the two-wheeled inverted pendulum vehicle 1 (S8). At this time, the inverter 18 supplies the motors 21, 22 with the same drive currents in response to the command value from the microcontroller 12, thus executing inverted control over the two-wheeled inverted pendulum vehicle 1. Therefore, the motors 21, 22 are driven at the same rotation speed. Thus, the rotation speeds of the right and left wheels 2 that are respectively rotated by the motors 21, 22 become equal to each other, so it is possible to keep the straight line stability of the two-wheeled inverted pendulum vehicle 1. Thus, after the vehicle speed of the two-wheeled inverted pendulum vehicle 1 has been sufficiently decreased, the rider is allowed to get off (S6).

Here, with the above-described configuration, when there occurs a failure of the first-line microcontroller 11 as an abnormality in the first-line control system, it is not possible to provide information about the abnormality of the first-line control system from the microcontroller 11 to the microcontroller 12. In this case, the microcontroller 12 is not able to switch the safety control relay 32 in response to detection of the abnormality in the first-line control system (S3).

Figure 10:
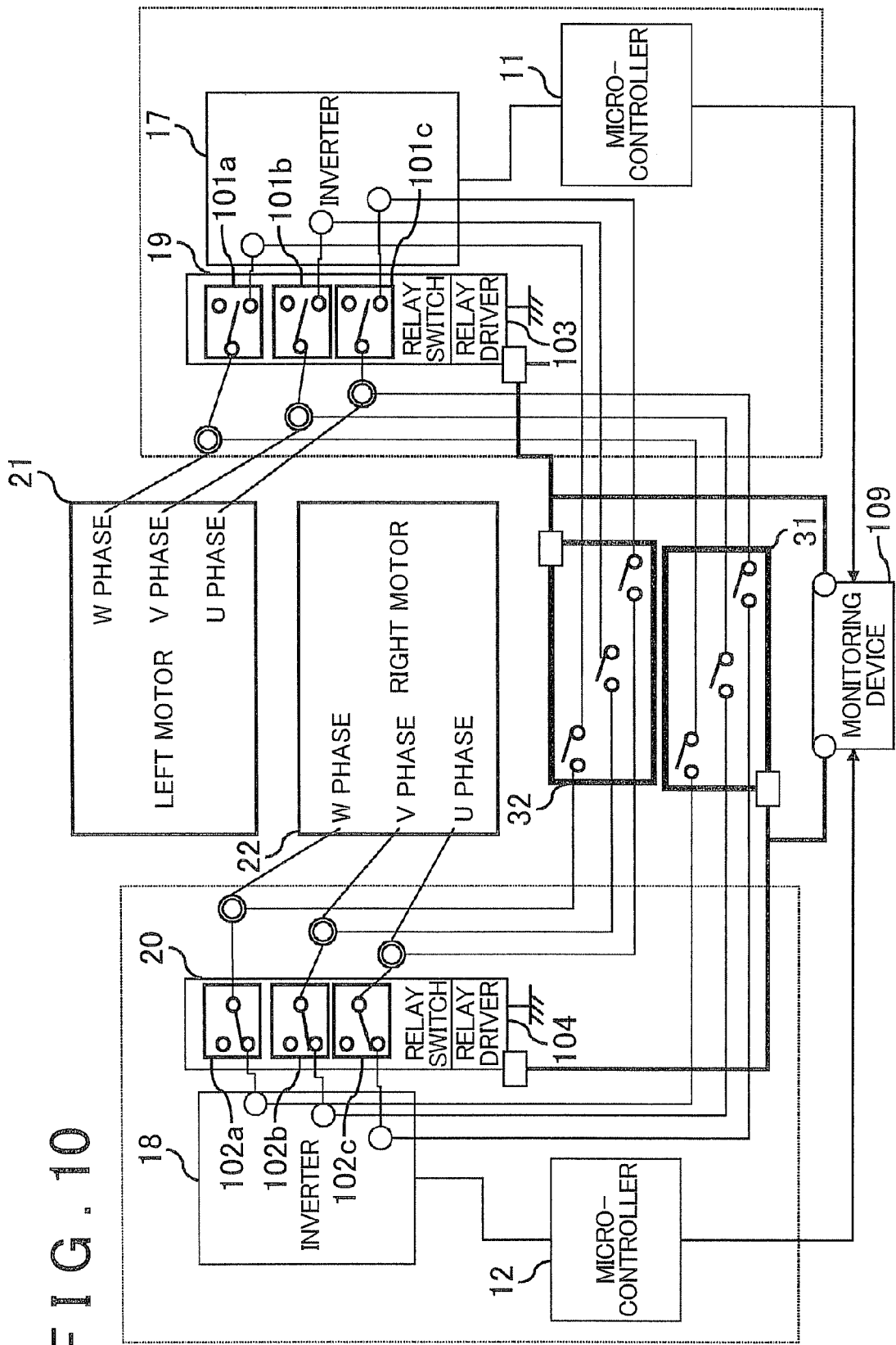
FIG. 10 is a block diagram that shows another configuration of the control device according to the second embodiment of the invention.

In order to avoid such a situation, the configuration of the safety control relays 31, 32 of the control device 10 may be the configuration shown in FIG. 10. That is, the control device 10 includes a monitoring device 109.

The monitoring device 109 functions as a watchdog timer, and is a circuit that detects an abnormality in the microcontroller 11 or the microcontroller 12. When the monitoring device 109 has detected an abnormality in the microcontroller 11 or the microcontroller 12, the monitoring device 109 switches the relay 19 or relay 20 of the corresponding control system so as to isolate the control system, in which an abnormality has been detected, from the motor 21 or the motor 22. When the monitoring device 109 has detected an abnormality in the microcontroller 11 or the microcontroller 12, the monitoring device 109 switches the safety control relay 31 or the safety control relay 32 such that the power of the inverter 17 or inverter 18 of the control system, to which the microcontroller 11 or the microcontroller 12, in which no abnormality has been detected, belongs, is transmitted to both the motors 21, 22.

Specifically, the microcontrollers 11, 12 each output a signal, which provides information that the microcontroller 11 or the microcontroller 12 is live, to the monitoring device 109 at predetermined time intervals. The monitoring device 109 monitors whether outputs of signals from the microcontrollers 11, 12 are continuing. When the monitoring device 109 determines that, for example, a signal is not output from the microcontroller 11 for a predetermined period of time (a period of time longer than the above predetermined time interval) and output of a signal from the microcontroller 11 is not continuing, the monitoring device 109 determines that there is an abnormality in the microcontroller 11.

In this case, the monitoring device 109 outputs the switch instruction signal, which indicates instructions for switching to the disconnected state, to the relay 19 of the control system to which the microcontroller 11 belongs. The relay 19 switches to the disconnected state in response to the switch instruction signal. In addition, the monitoring device 109 outputs the switch instruction signal, which indicates instructions for switching to the connected state, to the safety control relay 32. The safety control relay 32 switches to the connected state in response to the switch instruction signal.

Thus, drive currents that are output from the second-line inverter 18 are output to not only the motor 22 but also the motor 21. When the monitoring device 109 has detected an abnormality in the microcontroller 12, the monitoring device 109 outputs the switch instruction signal, which indicates instructions for switching to the disconnected state, to the relay 20, and outputs the switch instruction signal, which indicates instructions for switching to the connected state, to the safety control relay 31.

As described above, with the above configuration, even when there occurs an abnormality that causes the first-line microcontroller 11 to malfunction, it is possible to decrease the vehicle speed of the two-wheeled inverted pendulum vehicle 1 while keeping the straight line stability of the two-wheeled inverted pendulum vehicle 1 by switching the safety control relay 32 to also drive the first-line motor 21 from the second-line microcontroller 12.

In the above description, the description is made on the case where an abnormality has been detected in the first-line control system. When an abnormality has been detected in the second-line control system, it is obvious that a similar process is executed in a state where the microcontroller 11 and the microcontroller 12 are interchanged in position, so the description thereof is omitted.

As described above, in the second embodiment, when supply of drive currents from the first-line control system to the motor 21 is inhibited, the safety control relay 32 is switched such that drive currents from the second-line control system are also supplied to the motor 21. Thus, even when each of the motors 21, 22 is of a single-winding type in order to reduce cost and is allowed to be driven from any one of the control, systems, but when part of the functions of the any one of the control systems in which an abnormality has occurred are restricted, it is possible to drive both the motors 21, 22 at the same rotation speed by supplying the motors 21, 22 with drive currents from the normal control system. Therefore, it is possible to keep the straight line stability of the two-wheeled inverted pendulum vehicle 1. In addition, it is possible to keep the straight line stability through low-cost relays, so cost does not increase in this respect.

Third Embodiment of the Invention

Subsequently, a third embodiment of the invention will be described. The schematic configuration of the two-wheeled inverted pendulum vehicle 1 in the third embodiment is similar to the schematic configuration of the two-wheeled inverted pendulum vehicle 1 in the first embodiment described with reference to FIG. 1, so the description is omitted.

Figure 11:
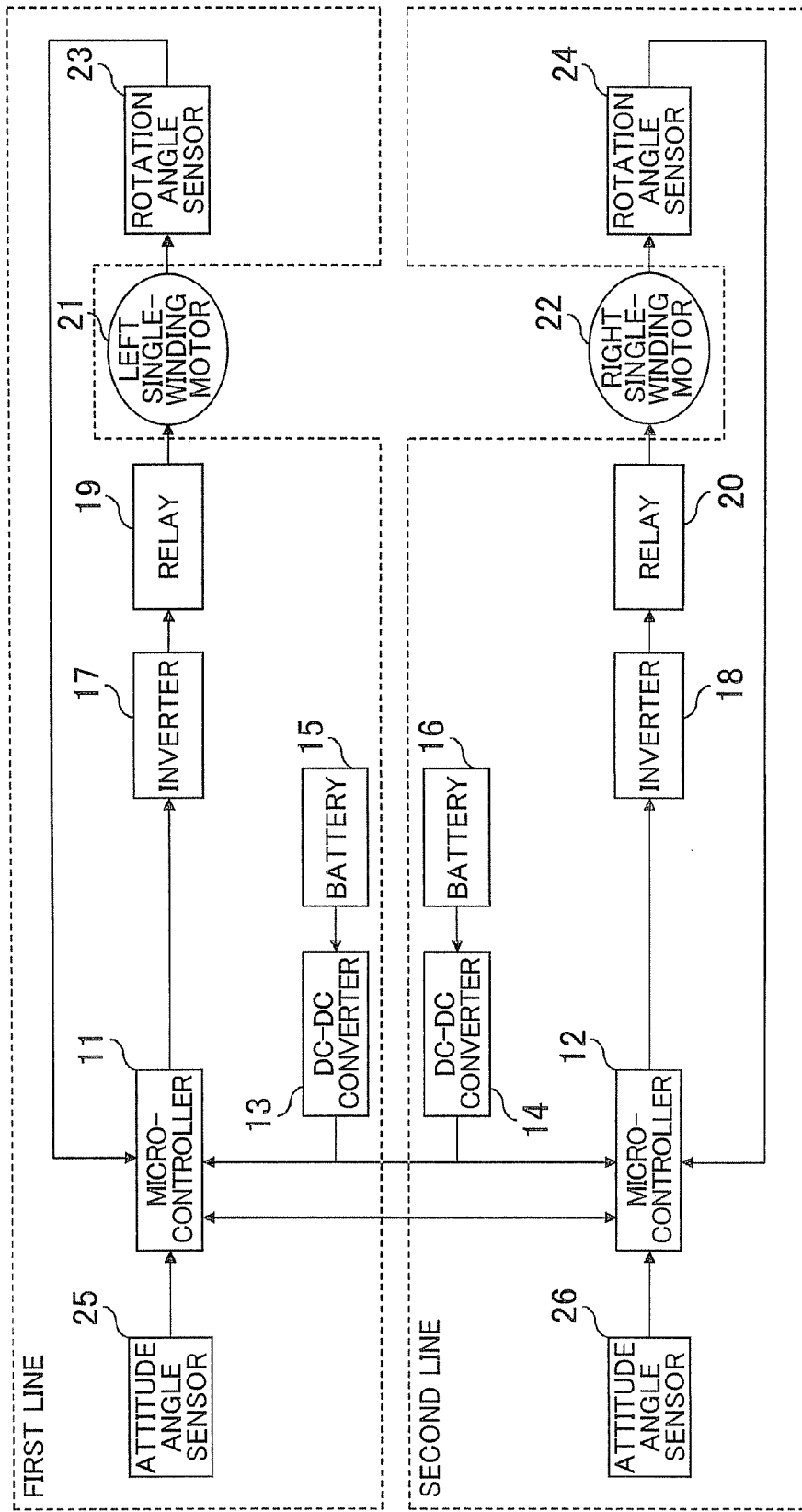
FIG. 11 is a block diagram that shows the configuration of a control device according to a third embodiment of the invention.

Subsequently, the configuration of the control device 10 according to the third embodiment of the invention will be described with reference to FIG. 11. FIG. 11 is a block diagram that shows the configuration of the control device 10 according to the third embodiment of the invention. Hereinafter, the description of contents similar to those of the first embodiment is omitted where appropriate.

In the third embodiment, the straight line stability of the two-wheeled inverted pendulum vehicle 1 is kept by using a differential suppressing device as will be described later. Therefore, as shown in FIG. 11, the control device 10 according to the third embodiment may not include the dynamic brake mechanisms 29, 30 or the yaw rate sensors 27, 28 that are used to determine whether to apply dynamic brake as compared to the control device 10 according to the first embodiment. In addition, as shown in FIG. 11, the control device 10 according to the third embodiment may not include the safety control relays 31, 32 as compared to the control device 10 according to the second embodiment.

Figure 12:
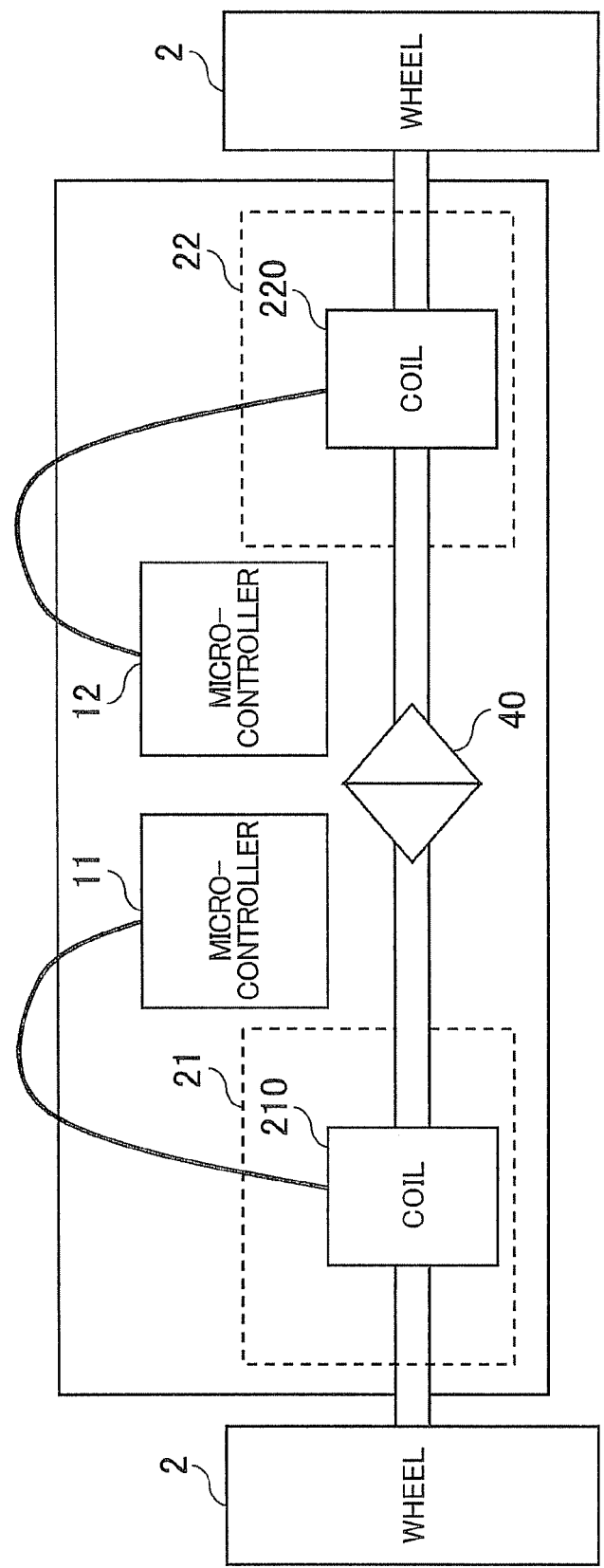
FIG. 12 is a view that shows the schematic structure of the inside of the two-wheeled inverted pendulum vehicle according to the third embodiment of the invention.

Subsequently, the schematic structure of the inside of the two-wheeled inverted pendulum vehicle 1 according to the third embodiment of the invention will be described with reference to FIG. 12. FIG. 12 is a view that shows the schematic structure of the inside of the two-wheeled inverted pendulum vehicle 1 according to the third embodiment of the invention.

In the third embodiment, as shown in FIG. 12, the output shaft of the motor 21 and the output shaft of the motor 22 are coupled by the differential suppressing device (also referred to as "differential limiting device" or "limited slip differential (LSD)") 40. The differential suppressing device 40 transmits a larger torque as the rotation differential (difference in rotation speed) between the right and left motors 22, 21 (right and left wheels 2) increases.

For example, a viscous coupling, a centrifugal clutch, or the like, may be utilized as the differential suppressing device 40. That is, in the case where the viscous coupling is used as the differential suppressing device 40, as the rotation difference between the right and left motors 22, 21 increases, torque is transmitted from the output shaft of the motor having a higher rotation speed to the output shaft of the motor having a lower rotation speed due to the viscous drag of viscous fluid in the viscous coupling. When the centrifugal clutch is used as the differential suppressing device 40, as the rotation speed of one of the motor 21 or the motor 22 increases, the centrifugal clutch is connected due to centrifugal force accordingly. Thus, torque is transmitted from the output shaft of the motor having a higher rotation speed to the output shaft of the motor having a lower rotation speed.

Figure 13A:
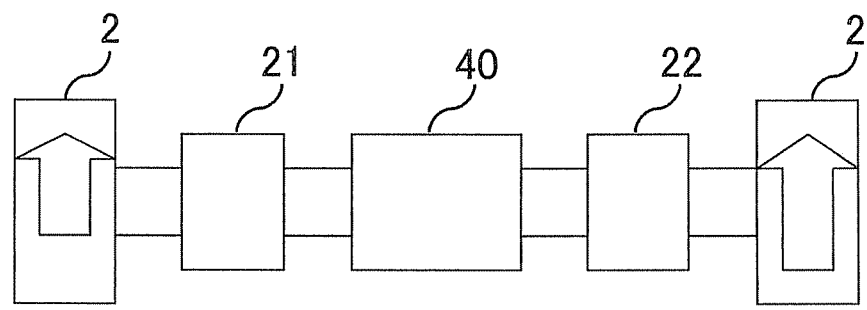
FIG. 13A is a view that shows a rotation difference and a torque transmission condition during normal times.
Figure 13B:
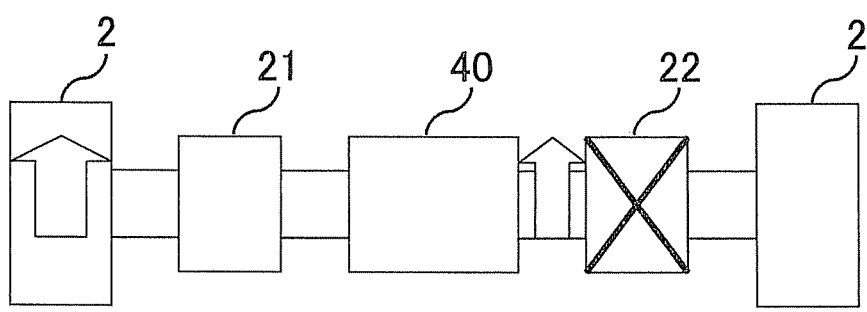
FIG. 13B is a view that shows a rotation difference and a torque transmission condition at the time of occurrence of an abnormality.
Figure 15:
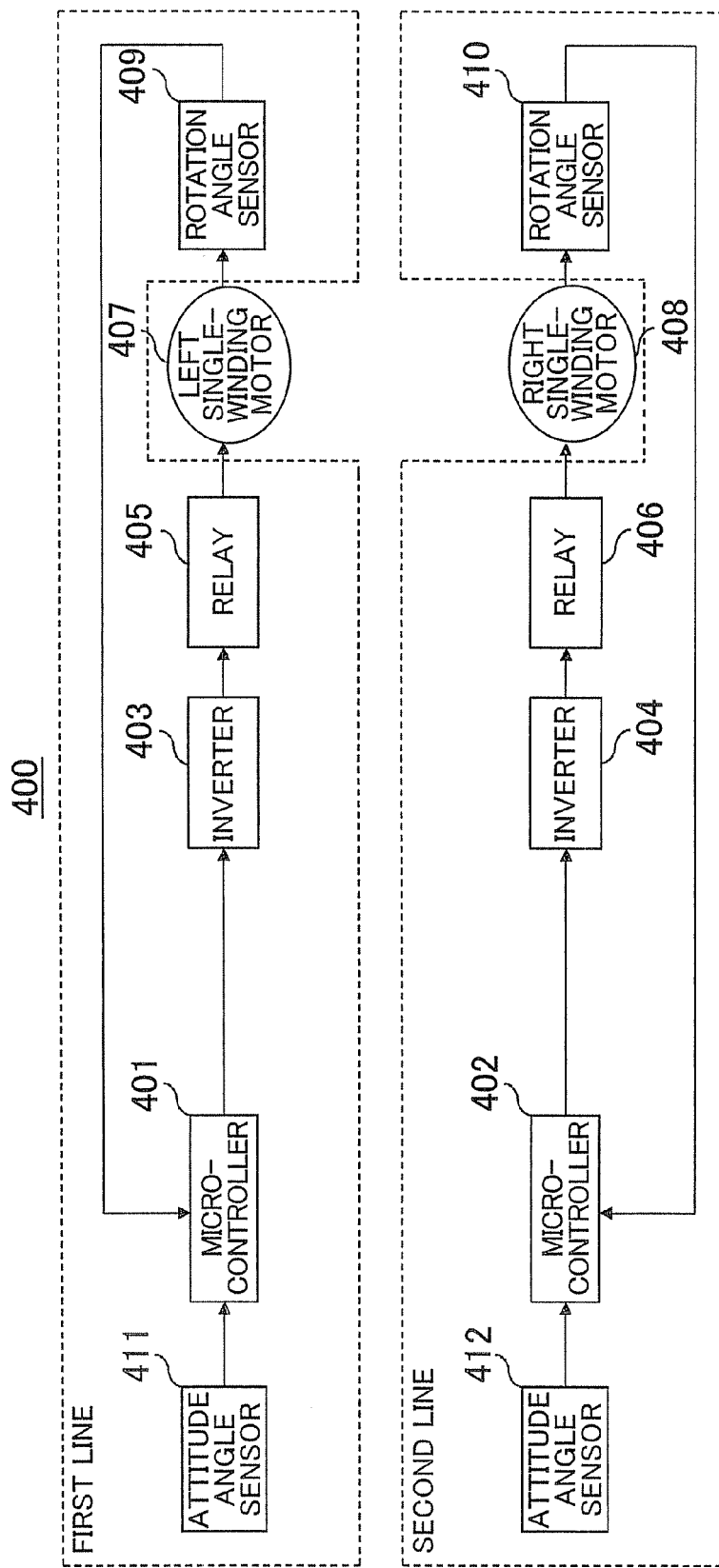
FIG. 15 is a block diagram that shows the configuration of control systems of a two-wheeled inverted pendulum vehicle that includes single-winding motors.
Figure 16:
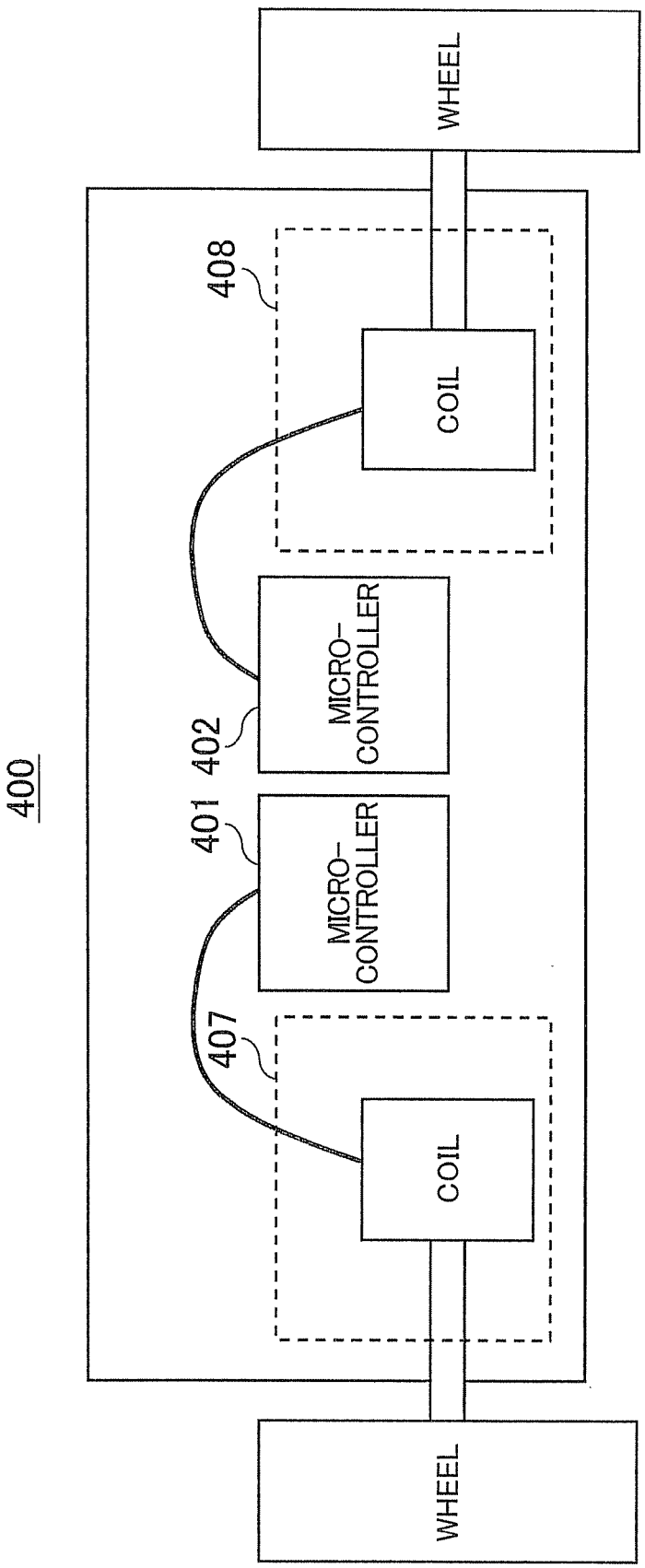
FIG. 16 is a view that shows the schematic configuration of the two-wheeled inverted pendulum vehicle that includes the single-winding motors.
Figure 17:
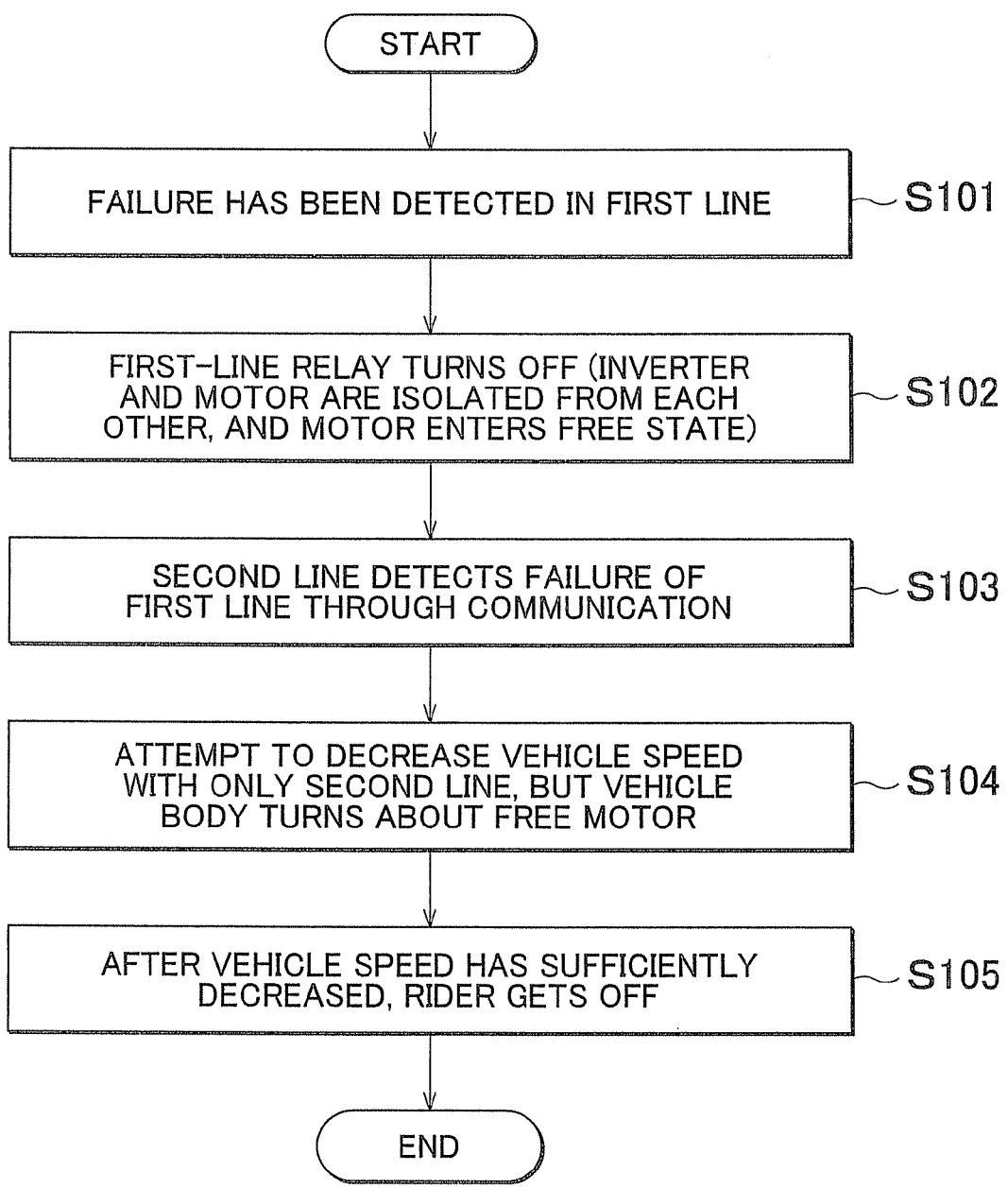
FIG. 17 is a flowchart that shows the operation of the two-wheeled inverted pendulum vehicle that includes the single-winding motors.

According to the characteristic of keeping the inverted state of the two-wheeled inverted pendulum vehicle 1, normally, as shown in FIG. 13A, a rotation difference is less likely to occur between the output shafts of the right and left motors 22, 21. However, when there occurs an abnormality in the control system and the motor 21 or the motor 22, which corresponds to that control system, becomes free, the motor 21 or the motor 22 is not driven, so there occurs a rotation difference between the output shafts of the right and left motors 22, 21. In this case, with the configuration according to the above-described third embodiment, as shown in FIG. 13B, it is possible to reduce the rotation difference by transmitting an insufficient amount of torque in the motor 21 or the motor 22 in a free state with the use of the differential suppressing device 40. That is, it is possible to keep the straight line stability of the two-wheeled inverted pendulum vehicle 1 by eliminating the rotation difference between the right and left wheels 2.

In addition, with the above-described configuration, even when the motor 21 or the motor 22 itself fails and is not allowed to be driven, it is possible to reduce the rotation speed difference by transmitting torque from the output shaft of the normal motor 21 or motor 22 to the output shaft of the failed motor 22 or motor 21. Therefore, it is possible to cause the two-wheeled inverted pendulum vehicle 1 to stably travel and bring the vehicle 1 to a stop state while keeping the straight line stability of the two-wheeled inverted pendulum vehicle 1.

Subsequently, a control process for the two-wheeled inverted pendulum vehicle 1 according to the third embodiment of the invention will be described with reference to FIG. 14. FIG. 14 is a flowchart that shows the control process for the two-wheeled inverted pendulum vehicle 1 according to the third embodiment of the invention. Like reference numerals denote steps similar to the steps of the control processes in the first and second embodiments described with reference to FIG. 5 and FIG. 9, and the description thereof is omitted.

In the third embodiment, as described above, a rotation difference between the output shafts of the right and left motors 22, 21 is absorbed by the differential suppressing device 40. Therefore, even when there occurs an abnormality in the first-line or second-line control system, the microcontroller 11 or the microcontroller 12 decreases the vehicle speed (S8) while executing drive control over the motor 21 or the motor 22 to keep the inverted state in response to detection of the abnormality in the other control system (S3) without consciousness of occurrence of the abnormality as shown in FIG. 14, with the result that it is possible to cause the two-wheeled inverted pendulum vehicle 1 to stably travel and bring the two-wheeled inverted pendulum vehicle 1 to a stop state while keeping the straight line stability of the two-wheeled inverted pendulum vehicle 1 (S6). That is, the process shown in step S5 in the first embodiment and the process shown in step S7 in the second embodiment are not required.

As described above, in the third embodiment, the output shaft of the motor 21 that is driven by the first-line control system and the output shaft of the motor 22 that is driven by the second-line control system are coupled to each other by the differential suppressing device 40. Thus, even when each of the motors 21, 22 is of a single-winding type in order to reduce cost and is allowed to be driven from any one of the control systems, it is possible to absorb the rotation difference between the output shafts of the motors 22, 21 that rotate the right and left wheels 2, so it is possible to keep the straight line stability of the two-wheeled inverted pendulum vehicle 1 by eliminating the rotation difference between the right and left wheels 2.

The invention is not limited to the above-described embodiments. The invention may be modified as needed without departing from the scope of the invention.

In the above-described first embodiment, the two yaw rate sensors 27, 28 are included in correspondence with the control systems; however, the number of yaw rate sensors is not limited to this configuration. For example, it is applicable that only one yaw rate sensor is provided and both the microcontrollers 11, 12 determine the yaw rate of the two-wheeled inverted pendulum vehicle 1 on the basis of a yaw rate signal from the only one yaw rate sensor. However, desirably, as described above, when the two yaw rate sensors 27, 28 are included in correspondence with the control systems, it is possible to improve failure resistance in the case where any one of the yaw rate sensors 27, 28 has failed.

In the above-described first embodiment, determination as to whether the two-wheeled inverted pendulum vehicle 1 is turning is detected on the basis of the yaw rate; however, information for making a determination is not limited to the yaw rate as long as the information is a physical quantity that varies with a turn of the two-wheeled inverted pendulum vehicle 1. For example, it is also applicable that the microcontrollers 11, 12 respectively acquire rotation angle signals from both the rotation angle sensors 23, 24 and determine whether the two-wheeled inverted pendulum vehicle 1 is turning on the basis of the rotation angles of both the motors 21, 22, detected by the rotation angle sensors 23, 24.

In the above-described first and second embodiments, the microcontroller 11 or the microcontroller 12 detects an abnormality in the control system to which that microcontroller 11 or microcontroller 12 belongs and provides information to the microcontroller 12 or the microcontroller 11 of the other control system; however, it is not limited to this configuration. The microcontrollers 11, 12 may directly detect an abnormality in the other control system, and may control the dynamic brake mechanism 29 or the dynamic brake mechanism 30 or may control the safety control relay 31 or the safety control relay 32. For example, it is applicable that a signal is periodically exchanged between the microcontroller 11 and the microcontroller 12 and, when the signal from the other one of the microcontrollers 11, 12 has lost, it is determined that there occurs an abnormality in the other one of the microcontrollers 11, 12 (control systems).

What is claimed is:

1. A two-wheeled inverted pendulum vehicle comprising:
   a single-winding first motor and a single-winding second motor configured to respectively rotate one of two wheels;
   a first control system and a second control system configured to respectively supply drive currents to the first motor and the second motor;
   a sensor configured to detect a physical quantity that varies with a turn of the two-wheeled inverted pendulum vehicle;
   a dynamic brake unit configured to be able to switch between an active state where a dynamic brake is applied to the first motor and an inactive state where the dynamic brake is not applied to the first motor; and
   a control unit configured to, when the control unit has determined that the two-wheeled inverted pendulum vehicle is turning about a side of the second motor on the basis of the physical quantity detected by the sensor while supply of drive current from the first control system to the first motor is inhibited, activate the dynamic brake in the dynamic brake unit, wherein
   the first control system is configured to, when an abnormality has been detected in the first control system, inhibit supply of drive current from the first control system to the first motor, and
   the dynamic brake includes a relay and a dynamic brake resistor, and the relay switches between a connected state where the motor is connected to the dynamic brake resistor and a disconnected state where the motor is disconnected from the dynamic brake resistor.

2. The two-wheeled inverted pendulum vehicle according to claim 1, wherein
   the second control system includes the control unit, and
   the control unit is configured to, when the control unit has determined that the two-wheeled inverted pendulum vehicle is turning about a side of the first motor on the basis of the physical quantity detected by the sensor while supply of drive current from the first control system to the first motor is inhibited, supply drive current to the second motor such that a rotation speed of the second motor is decreased.

3. The two-wheeled inverted pendulum vehicle according to claim 2, wherein
   the sensor is a yaw rate sensor configured to detect a yaw rate of the two-wheeled inverted pendulum vehicle as the physical quantity, and
   the control unit is configured to, when the yaw rate detected by the yaw rate sensor is larger than a predetermined threshold, activate the dynamic brake or decrease the rotation speed of the second motor.

4. The two-wheeled inverted pendulum vehicle according to claim 3, wherein
   the control unit is configured to, when the yaw rate detected by the yaw rate sensor is smaller than or equal to the predetermined threshold, deactivate the dynamic brake in the dynamic brake unit.

5. A control method for a two-wheeled inverted pendulum vehicle including: a single-winding first motor and a single-winding second motor configured to respectively rotate one of two wheels; and a first control system and a second control system configured to respectively supply drive currents to the first motor and the second motor, the control method comprising:
   when an abnormality has been detected in the first control system, inhibiting supply of drive current from the first control system to the first motor;
   detecting a physical quantity that varies with a turn of the two-wheeled inverted pendulum vehicle;
   determining whether the two-wheeled inverted pendulum vehicle is turning about a side of the second motor on the basis of the detected physical quantity; and
   when it is determined that the two-wheeled inverted pendulum vehicle is turning about the side of the second motor, applying a dynamic brake to the first motor,
   wherein the dynamic brake includes a relay and a dynamic brake resistor, and the relay switches between a connected state where the motor is connected to the dynamic brake resistor and a disconnected state where the motor is disconnected from the dynamic brake resistor.

* * * * *